(12) United States Patent
Hildebrand

(10) Patent No.: US 11,943,187 B1
(45) Date of Patent: *Mar. 26, 2024

(54) SOCIAL MEDIA PLATFORM FOR SHARING REACTIONS TO VIDEOS

(71) Applicant: A Social Company, Palos Verdes Peninsula, CA (US)

(72) Inventor: Harold R Hildebrand, Palos Verdes Peninsula, CA (US)

(73) Assignee: A SOCIAL COMPANY, Palos Verdes Peninsula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,875

(22) Filed: Nov. 10, 2023

Related U.S. Application Data

(63) Continuation of application No. 17/454,362, filed on Nov. 10, 2021, now Pat. No. 11,888,800, which is a
(Continued)

(51) Int. Cl.
| | |
|---|---|
| H04L 51/48 | (2022.01) |
| G06F 15/16 | (2006.01) |
| G06F 40/30 | (2020.01) |
| G06K 9/00 | (2022.01) |
| H04L 12/58 | (2006.01) |
| H04L 15/16 | (2006.01) |
| H04L 51/10 | (2022.01) |

(Continued)

(52) U.S. Cl.
CPC .............. *H04L 51/10* (2013.01); *H04L 51/48* (2022.05); *H04L 51/52* (2022.05); *H04N 23/64* (2023.01)

(58) Field of Classification Search
CPC ......... H04L 51/10; H04L 51/28; H04L 51/32; H04N 5/23222

USPC .......................................................... 709/206
See application file for complete search history.

(56) References Cited

U.S. PATENT DOCUMENTS 9,762,848 B2    9/2017 Nowakowski et al.
9,934,544 B1 *  4/2018 Whitfield ............. G06Q 50/265
(Continued)

FOREIGN PATENT DOCUMENTS

WO       2015000085 A2     1/2015

OTHER PUBLICATIONS

Extended European Search Report in EP20763137.5, dated Nov. 8, 2022, 11 pages.
(Continued)

*Primary Examiner* — David R Lazaro
*Assistant Examiner* — Berhanu Shitayewoldetadik
(74) *Attorney, Agent, or Firm* — ArentFox Schiff LLP

(57) ABSTRACT

Disclosed herein are systems and methods for reaction recording generation and transmission. A method may include receiving, from a first computing device, a video and a request for a recording of a user during output of a portion of the video on the second computing device. The method may include generating a request for consent from the user to capture the recording during the output of the portion, outputting the video on the second computing device, and in response to receiving the consent, determining whether the portion of the video is being outputted. In response to detecting that the output of the portion has initiated, the method may include capturing the recording throughout the output of the portion and transmitting the recording to the first computing device.

27 Claims, 16 Drawing Sheets

Related U.S. Application Data continuation of application No. 16/799,683, filed on Feb. 24, 2020, now Pat. No. 11,178,085, which is a continuation-in-part of application No. 16/286,877, filed on Feb. 27, 2019, now Pat. No. 11,196,692.

(51) Int. Cl.
*H04L 51/52* (2022.01)
*H04N 23/60* (2023.01)

(56) References Cited

U.S. PATENT DOCUMENTS

| | | | |
|---|---|---|---|
| 9,967,618 B2 | 5/2018 | Blong et al. |
| 10,204,308 B2 | 2/2019 | Deas et al. |
| 10,419,375 B1 | 9/2019 | Sokolov et al. |
| 10,573,048 B2 | 2/2020 | Ni et al. |
| 10,694,255 B2 | 6/2020 | Taylor |
| 10,701,542 B2 | 6/2020 | Martin et al. |
| 2006/0168065 A1 | 7/2006 | Martin |
| 2006/0184578 A1 | 8/2006 | La Rotonda et al. |
| 2007/0027787 A1 | 2/2007 | Tripp |
| 2007/0186231 A1 | 8/2007 | Haeuser et al. |
| 2008/0002941 A1 | 1/2008 | Zheng |
| 2008/0056942 A1 | 3/2008 | Arima et al. |
| 2008/0068465 A1 | 3/2008 | Kondoh |
| 2009/0210504 A1 | 8/2009 | Shuster |
| 2010/0020222 A1 | 1/2010 | Jones et al. |
| 2010/0036697 A1 | 2/2010 | Kelnar |
| 2011/0107362 A1 | 5/2011 | Reilly et al. |
| 2011/0219135 A1 | 9/2011 | Minamizawa et al. |
| 2011/0231401 A1 | 9/2011 | Bocking et al. |
| 2012/0002113 A1 | 1/2012 | Nishio et al. |
| 2013/0125026 A1 | 5/2013 | Gaume |
| 2013/0128058 A1 | 5/2013 | Sagayaraj et al. |
| 2013/0185368 A1 | 7/2013 | Nordstrom et al. |
| 2014/0052656 A1 | 2/2014 | Ball |
| 2014/0096167 A1 | 4/2014 | Lang et al. |
| 2014/0193047 A1 | 7/2014 | Grosz et al. |
| 2014/0274307 A1 | 9/2014 | Gonzalez |
| 2014/0317006 A1 | 10/2014 | Brill et al. |
| 2014/0344718 A1 | 11/2014 | Rapaport et al. |
| 2014/0359656 A1 | 12/2014 | Banica et al. |
| 2014/0363074 A1 | 12/2014 | Dolfing et al. |
| 2014/0363083 A1 | 12/2014 | Xia et al. |
| 2014/0380405 A1 | 12/2014 | Forsberg et al. |
| 2015/0089289 A1 | 3/2015 | Gahoi et al. |
| 2015/0156543 A1 | 6/2015 | Allegretti et al. |
| 2015/0230127 A1 | 8/2015 | Raleigh et al. |
| 2015/0304268 A1 | 10/2015 | Byttow et al. |
| 2016/0012133 A1 | 1/2016 | Shim et al. |
| 2016/0072797 A1 | 3/2016 | Wilson et al. |
| 2016/0077598 A1 | 3/2016 | Lection et al. |
| 2016/0092044 A1 | 3/2016 | Laska et al. |
| 2016/0104474 A1 | 4/2016 | Bunn et al. |
| 2016/0192166 A1* | 6/2016 | deCharms ............ H04N 7/148 348/14.02 |
| 2016/0203566 A1 | 7/2016 | Kataria et al. |
| 2016/0234551 A1 | 8/2016 | Allegretti et al. |
| 2016/0366203 A1 | 12/2016 | Blong et al. |
| 2017/0019496 A1 | 1/2017 | Orbach |
| 2017/0140174 A1 | 5/2017 | Lacey et al. |
| 2017/0155515 A1 | 6/2017 | Androulaki et al. |
| 2017/0177176 A1 | 6/2017 | Harpole et al. |
| 2017/0273006 A1 | 9/2017 | Hua et al. |
| 2017/0357782 A1 | 12/2017 | Leske et al. |
| 2018/0077096 A1 | 3/2018 | DeMattei |
| 2018/0101734 A1 | 4/2018 | Lemberger et al. |
| 2018/0183595 A1 | 6/2018 | Raduchel |
| 2018/0204382 A1 | 7/2018 | Simpson |
| 2018/0220108 A1 | 8/2018 | Siminoff et al. |
| 2018/0234738 A1 | 8/2018 | Sarkar et al. |
| 2018/0300851 A1 | 10/2018 | Elor et al. |
| 2018/0324496 A1 | 11/2018 | Taylor |
| 2018/0338088 A1 | 11/2018 | Wakana |
| 2018/0338111 A1 | 11/2018 | Mourkogiannis et al. |
| 2018/0374164 A1 | 12/2018 | Ozog |
| 2019/0012458 A1 | 1/2019 | Fausak et al. |
| 2019/0036856 A1 | 1/2019 | Bergenlid et al. |
| 2019/0124021 A1 | 4/2019 | DeMattei |
| 2019/0215772 A1 | 7/2019 | Anderson et al. |
| 2019/0238424 A1 | 8/2019 | Guan et al. |
| 2019/0238428 A1 | 8/2019 | Guan et al. |
| 2019/0286244 A1 | 9/2019 | Lection et al. |
| 2019/0335136 A1* | 10/2019 | Harpole ............ H04N 21/2353 |
| 2020/0028810 A1 | 1/2020 | Werner et al. |
| 2020/0344527 A1 | 10/2020 | Taylor |
| 2020/0349610 A1 | 11/2020 | Publicover et al. |
| 2020/0358908 A1 | 11/2020 | Scalisi |
| 2022/0199265 A1 | 6/2022 | Tadandja |

OTHER PUBLICATIONS

Venolia et al., "Seesaw: I See You Saw My Video Message," Shared Experience, Aug. 24-27, 2015, MobileHCI'15, Copenhagen, Denmark, pp. 244-253.

* cited by examiner

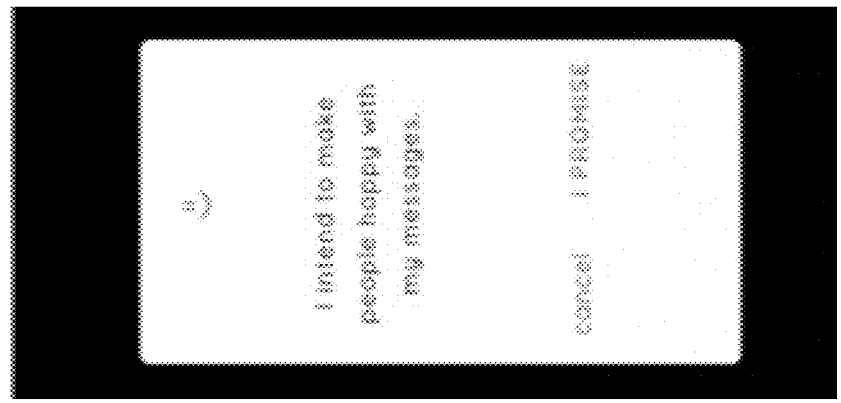
FIG. 2

801

REMINDER

Remember, Smile messages are intended to make your people Smile.

Negative messages can result in your writing privileges being suspended.

GOT IT

802

WARNING

Two of your messages have been reported.

Another negative message will result in your writing privileges being suspended.

GOT IT

803

SUSPENDED

Oh no! Three of your messages have been reported and your writing privileges have been suspended.

If you'd like to have reinstated, you can write apologies to your people. If they accept your apology, your writing privileges will be reinstated!

APOLOGIZE maybe later

When you make people Smile,
thank them by recording up to a
3 second video.

Some suggestions include:

You rock
Great minds think alike
Thank you
Glad you liked it

RECORD

FIG. 10

SOCIAL MEDIA PLATFORM FOR SHARING REACTIONS TO VIDEOS

CROSS-REFERENCE TO RELATED APPLICATIONS

This application is a continuation of U.S. application Ser. No. 17/454,362 filed on Nov. 10, 2021, which is a continuation of U.S. application Ser. No. 16/799,683 filed on Feb. 24, 2020, now U.S. Pat. No. 11,178,085, issued Nov. 16, 2021, which is a continuation-in-part of U.S. application Ser. No. 16/286,877, filed on Feb. 27, 2019, now U.S. Pat. No. 11,196,692, issued Dec. 7, 2021—all of which are incorporated herein by reference in their entirety.

TECHNICAL FIELD

The disclosed teachings relate to social media platforms. More specifically, the disclosed teachings relate to sharing messages and videos based on a social contract and opting to receive reaction videos.

BACKGROUND

Current social networks or communication platforms allow users to connect with other users and interact with each other. For example, some social networks allow users to post messages, images, videos and receive comments or a "like" for their posts. These social networks focus on content sharing, building new relationships and growing the social network of a user, e.g., having more and new friends in the user's social network. While these social networks help in growing a user's social network and content sharing, they do not aid in strengthening of an existing relationship between users, promoting a positive emotion, e.g., happiness, or restricting spreading of a negative emotion. Some studies indicate that some users of these social networks experience negative emotions, such as, depression, low self-esteem, and bitter jealousy among the users. The studies found that one of the reasons for such a feeling to be "social comparison," in which individuals were more likely to compare themselves to others better off than they were and that they would be more bothered by being tagged in unflattering pictures. Those with major depressive disorder were less likely to post pictures of themselves along with other people and reported fewer followers. The current social networks do not aid in strengthening an existing relationship of a user or promoting a positive emotion, e.g., happiness, and restricting spreading of a negative emotion.

SUMMARY

In some aspects, the techniques described herein relate to a method for reaction recording generation and transmission, including: receiving, from a first computing device of a first user, a video at a second computing device of a second user, wherein the video is transmitted over a communication platform; receiving, from the first computing device, a request for a recording of the second user during output of a portion of the video on the second computing device; generating a request for consent from the second user to capture the recording during the output of the portion; outputting the video on the second computing device; in response to receiving the consent, determining whether the portion of the video selected by the first user is being outputted; in response to detecting that the output of the portion has initiated, capturing the recording throughout the output of the portion; and transmitting the recording to the first computing device.

In some aspects, the techniques described herein relate to a method, wherein the portion is selected by the first user prior to transmitting the video to the second computing device, and wherein the portion is automatically selected if the first user does not make a selection of the portion.

In some aspects, the techniques described herein relate to a method, wherein capturing the recording includes: activating a camera on board the second computing device, wherein the camera faces the second user.

In some aspects, the techniques described herein relate to a method, further including: requesting consent from the second user to send the recording to the first computing device; and in response to receiving the consent from the second user, transmitting the recording to the first computing device.

In some aspects, the techniques described herein relate to a method, wherein the portion of the video is identified by a time elapsed in the video and a time remaining in the video.

In some aspects, the techniques described herein relate to a method, wherein receiving the video further includes: receiving, from the second user, a selection of one or more moods from a predetermined list of moods; identifying, from a plurality of videos, the video in response to determining that the video corresponds to the one or more moods; and retrieving the video from the first computing device.

In some aspects, the techniques described herein relate to a method, wherein the predetermined list of moods includes one or more of: happy, sad, motivated, surprised, studious.

In some aspects, the techniques described herein relate to a method, wherein capturing the recording further includes: stopping the recording immediately after output of the portion has ended.

In some aspects, the techniques described herein relate to a method, further including: requesting, on the second computing device, at least one selection from a plurality of indicators of a type of emotion the video generated, wherein the plurality of indicators includes a "like" indicator that is indicative of a positive emotion and a "dislike" indicator that is indicative of a negative emotion.

In some aspects, the techniques described herein relate to a method, further including: receiving a selection, by the second user, of the "dislike" indicator that is indicative of the negative emotion.

In some aspects, the techniques described herein relate to a method, further including: generating a prompt at the second computing device that provides an option for the second user to report the first user to the communication platform.

In some aspects, the techniques described herein relate to a method, wherein the communication platform is configured to determine whether the first user is violating a social contract of the communication platform based on metric associated with the first user, wherein the metric includes one or more of a first number of "dislikes" received for the first user from a specified user, a second of number of "dislikes" received for the first user from multiple users, a third number of reports received against the first user, a frequency at which the dislikes are received, or a frequency at which the reports are received.

In some aspects, the techniques described herein relate to a method, wherein the communication platform is further configured to determine if a combination of the metrics exceeds a specified threshold, and respond to a determination that the combination of the metrics exceeds the specified threshold by suspending recording privileges of the first user that disables the first user from sending videos to any of multiple users of the communication platform.

In some aspects, the techniques described herein relate to a method, further including: determining that the second user has reported the first user for sending the video, wherein the communication platform is configured to block communication between the first user and the second user.

In some aspects, the techniques described herein relate to a method, wherein the communication platform is configured to open the communication between the first user and the second user in response to determining that the second user has removed the report against the first user.

In some aspects, the techniques described herein relate to a method, wherein receiving the video further includes: determining if the video is sent anonymously; and in response to a determination that the video is sent anonymously, removing user identifiable information associated with the first user from the video prior to outputting the video.

In some aspects, the techniques described herein relate to a method, further including: determining if the second user reported the first user to the communication platform; and in response to a determination that the second user reported the first user, revealing the user identifiable information associated with the first user to the second user.

In some aspects, the techniques described herein relate to a method, further including: generating multiple categories of contacts, each category being representative of a relationship type of the second user with contacts in that category, wherein the relationship type is determined based on a degree of interaction between the second user and the contacts in the communication platform.

In some aspects, the techniques described herein relate to a method, further including: receiving multiple videos generated by the second user, wherein each video contains information regarding the second user that is customized for a specified relationship type; and assigning a specified video that is generated for a specified relationship type to a corresponding specified category, wherein contacts in the specified category are restricted from viewing videos other than the one assigned to the specified category.

In some aspects, the techniques described herein relate to a method, wherein generating the multiple categories includes: generating a first category of the multiple categories, which includes all contacts from an address book stored in the computing device, generating a second category of the multiple categories, which includes those contacts from the address book to whom the second user has sent one or more videos; and generating a third category of the multiple categories, which includes those contacts from the address book with whom the second user has exchanged one or more videos.

In some aspects, the techniques described herein relate to a method, further including: assigning a first video to the first category, a second video to the second category, and a third video to the third category, wherein each of the three videos has a recording of the second user with content relevant to the corresponding category, wherein contacts in a category of multiple categories are restricted from viewing videos other than the one assigned to the corresponding category.

In some aspects, the techniques described herein relate to a method, further including: determining if a specified contact in any of the multiple categories of contacts of the second user has an associated video; and displaying, at the second computing device, a video indicator in association with the specified contact, the video indicator indicating that the specified contact has the associated video.

In some aspects, the techniques described herein relate to a method, further including: receiving a request from the second user to view the associated video; and determining a specified category to which the second user is classified into for the specified contact, retrieving the associated video corresponding to the specified category.

In some aspects, the techniques described herein relate to a method, further including: generating an inbox folder on the second computing device, wherein the inbox folder provides access to a first set of videos received from one or more users of the communication platform, wherein at least some videos from the first set of videos includes video recordings of corresponding users while viewing portions of the at least some videos.

In some aspects, the techniques described herein relate to a method, further including: generating an outbox folder on the second computing device, wherein the outbox folder provides access to a second set of videos sent by the second user to one or more users of the communication platform, wherein at least some videos from the second set of videos includes video recordings of the second user while viewing portions of the at least some videos.

In some aspects, the techniques described herein relate to a system for reaction recording generation and transmission, including: a memory; and a processor communicatively coupled with the memory and configured to: receive, from a first computing device of a first user, a video at a second computing device of a second user, wherein the video is transmitted over a communication platform; receive, from the first computing device, a request for a recording of the second user during output of a portion of the video on the second computing device; generate a request for consent from the second user to capture the recording during the output of the portion; output the video on the second computing device; in response to receiving the consent, determine whether the portion of the video selected by the first user is being outputted; in response to detecting that the output of the portion has initiated, capture the recording throughout the output of the portion; and transmit the recording to the first computing device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 shows example screenshots of a messaging app displaying the social contract, consistent with various embodiments.

FIG. 8 shows example prompts that a user would see when their messages are being reported for having negative content.

FIG. 10 shows an example prompt a user may receive after recording a video or writing a message.

DETAILED DESCRIPTION

Figure 1:
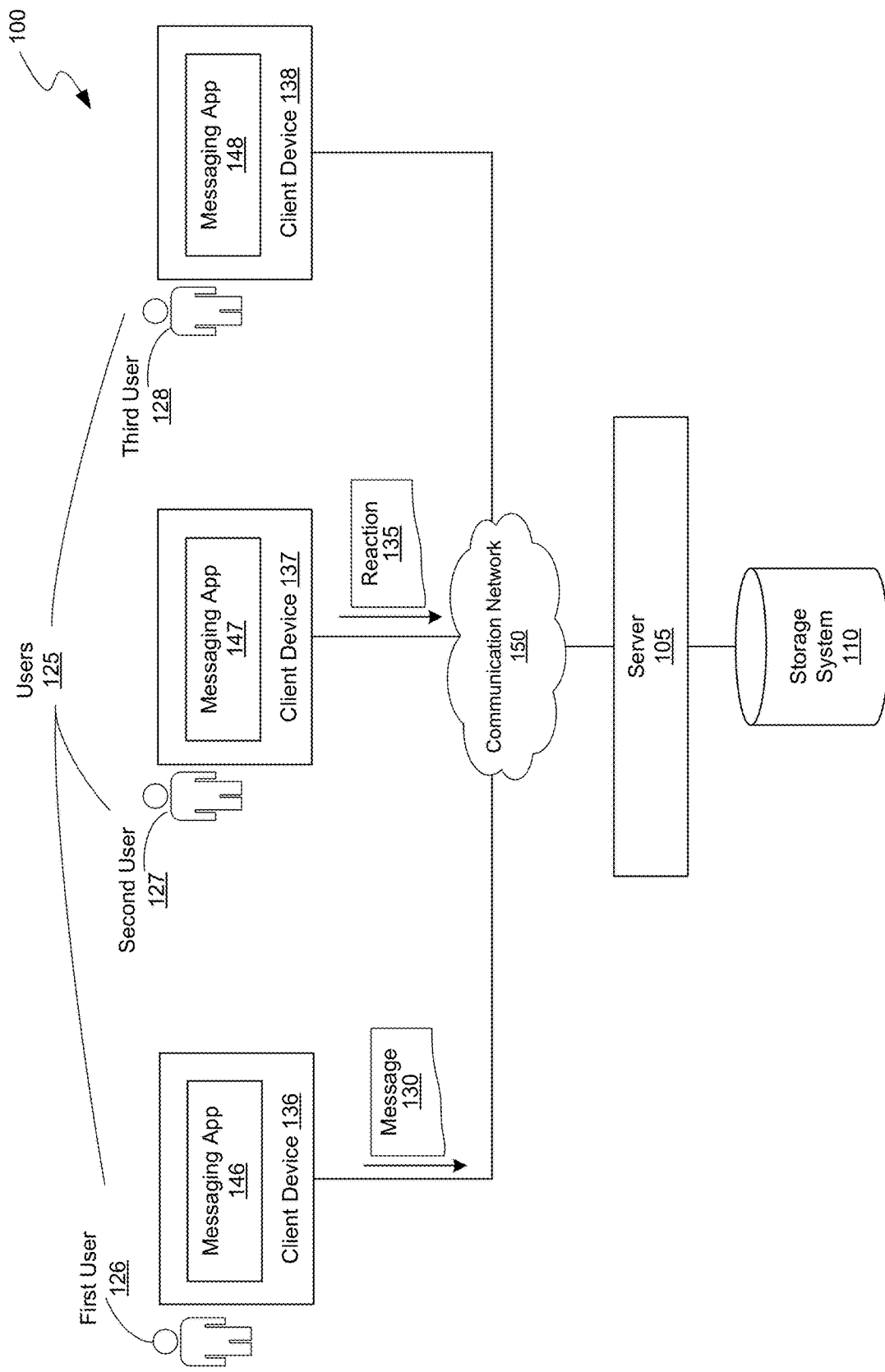
FIG. 1 is a block diagram of an environment in which the disclosed embodiments can be implemented.

Embodiments are directed to a social media platform with reaction sharing capability. The platform can include a social contract that messages and videos exchanged between users spread or create a positive emotion, such as happiness. Any message and/or video that a recipient found to generate a negative emotion can be found to be in violation of the social contract, and the communication platform can restrict senders of such messages and/or videos from spreading negative emotion, e.g., by suspending their writing privileges. Thus, the communication platform can encourage users to spread positive emotions. When a recipient receives a message and/or video, the recipient indicates to the communication platform a type of emotion, e.g., a positive emotion (which is in accordance with the social contract) or a negative emotion (which is in violation of the social contract), the message and/or video generated in the recipient. The communication platform tracks various metrics regarding users of the communication platform, such as a number of times a specified user has violated the social contract, a percentage of messages and/or videos sent by the specified user that is found in violation of the social contract, a number of times the specified user is reported to the communication platform, or a frequency of the violation. The communication platform can suspend the writing privileges of the specified user when one or more metrics exceed their thresholds, which prevents the user from sending messages and/or videos and therefore, stop spreading of negative emotions by the specified user. After the suspension, the specified user may continue to receive messages and/or videos from other users but would not be able to send messages and/or videos to other users.

The communication platform encourages spreading of positive emotions. For example, when a recipient of a message and/or video indicates to the communication platform that the message and/or video generated a positive emotion, a sender of the message and/or video is made aware of that, which encourages the sender to send messages and/or videos that generate a positive emotion. In another example, the communication platform enables the recipient to send a reaction of the recipient in reading the message and/or viewing the video to the sender, which can further encourage the sender to continue sending messages and/or videos that generate such positive emotion. The reaction can be a video recording of the recipient reading the message and/or viewing the video and his/her reaction to the message and/or video. Such exchanges between a pair of users in which (a) a message and/or video generates a positive emotion in the recipient, (b) the recipient sends a video recording of the reaction to the sender, and (c) the sender experiences a positive emotion upon viewing the video recording of the reaction of the recipient, not only promotes generating positive emotion between the pair of users, but also aids in strengthening the relationship between the pair of users.

In another example, the communication platform enables the sender of a video to select one or more portion(s) of the video for which the reaction of the recipient should be recorded. The communication platform can inform the recipient that the sender has requested a reaction video for a portion of the video and request permission to record during that portion. This can allow a sender to better analyze which parts of a video made the recipient happy and which parts of the video made them upset. For example, a stand-up comedian can use this feature to gauge which jokes in the routine get the best response from a recipient.

Turning now to FIG. 1, FIG. 1 is a block diagram of an environment 100 in which the communication platform can be implemented. The environment 100 includes a server 105, which implements at least a portion of the communication platform and facilitates exchanging of messages between users 125 of the communication platform. The communication platform also includes a client-side portion that enables a user to send or receive messages, among other functionalities of the communication platform. The client-side portion can be implemented as an app, e.g., a mobile app, which can be installed and executed on client devices 136-138 associated with users 125. The client-side portion of the communication platform can also be implemented as a browser-based application, which can be accessed using a web browser application on the client devices 136-138. An executable file for generating the app can be stored at the server 105, storage system 110 associated with the server 105, or at a different location that is accessible by the client devices 136-138. Users 125 can install the app in their respective client devices 136-138 by downloading the app from any of the above locations. A client device can be any of a desktop, laptop, tablet PC, smartphone, wearable device or any computing device that is capable of accessing the server 105 over a communication network 150 and is capable recording videos, sending and/or receiving multimedia content from a user.

In the following paragraphs the client-side portion of the communication platform is implemented as an app (also referred to as "messaging app"). Each of the users 125 can install the messaging app on their respective client devices. For example, the first user 126 can install the messaging app ("messaging app 146") on the client device 136, the second user 127 can install the messaging app ("messaging app 147") on the client device 138, and the third user 128 can install the messaging app ("messaging app 148") on the client device 138. The messaging apps installed on the communication platform encourages the users 125 to exchange messages between them in accordance with a social contract, e.g., promote a positive emotion among the users 125, and restricts those of the users 125 who send messages that are in violation of the social contract, e.g., messages that generate negative emotions in a recipient, by suspending writing privileges of those users. While the social contract is described as spreading a positive emotion, such as happiness, it is not restricted to a positive emotion and include other factors.

Users 125 are required to accept the social contract before they can send or receive messages. For example, when a first user 126 uses the messaging app 146 for the first time, the messaging app 146 displays the social contract, such as "I intend to make people happy with my messages" and requires the user to accept the contract before the first user 126 can send or receive any messages from other users. This message can remind the first user 126 that the communication platform is about spreading positive emotions. FIG. 2 shows example screenshots of the messaging app displaying the social contract, consistent with various embodiments. In some embodiments, the GUIs of FIG. 2 are part of the messaging app 146. The GUI 205 displays a brief description of the messaging app and the GUI 210 displays the social contract. A user can send messages to other users only upon accepting the social contract, e.g., selecting "I Promise" option in the GUI 210. If the user does not accept the social contract, the messaging app does not let the user send messages to other users (but can receive messages from other users).

Some of the functionalities supported by the messaging app include sending a message to a user, receiving a message from a user, and posting a message that can be viewed by multiple users, recording videos of reactions to reading a message, recording "catch-up" videos having information about a particular user for consumption by a category of users, and recording videos of users having descriptive content, all of which are described in the following paragraphs.

In some embodiments, the messaging app can act a content sharing app. Some additional functionalities can include sharing audio, video, images, GIFs, URL links, coupons, location, and any other shareable content. In some embodiments, the app can facilitate screen sharing. For example, user A can be messaging user B regarding private information such as a bank statement or health records. However, to get another opinion user A may want to share the information with user B. To do so, user A can then choose to share screens with user B to display the information.

Figure 3:
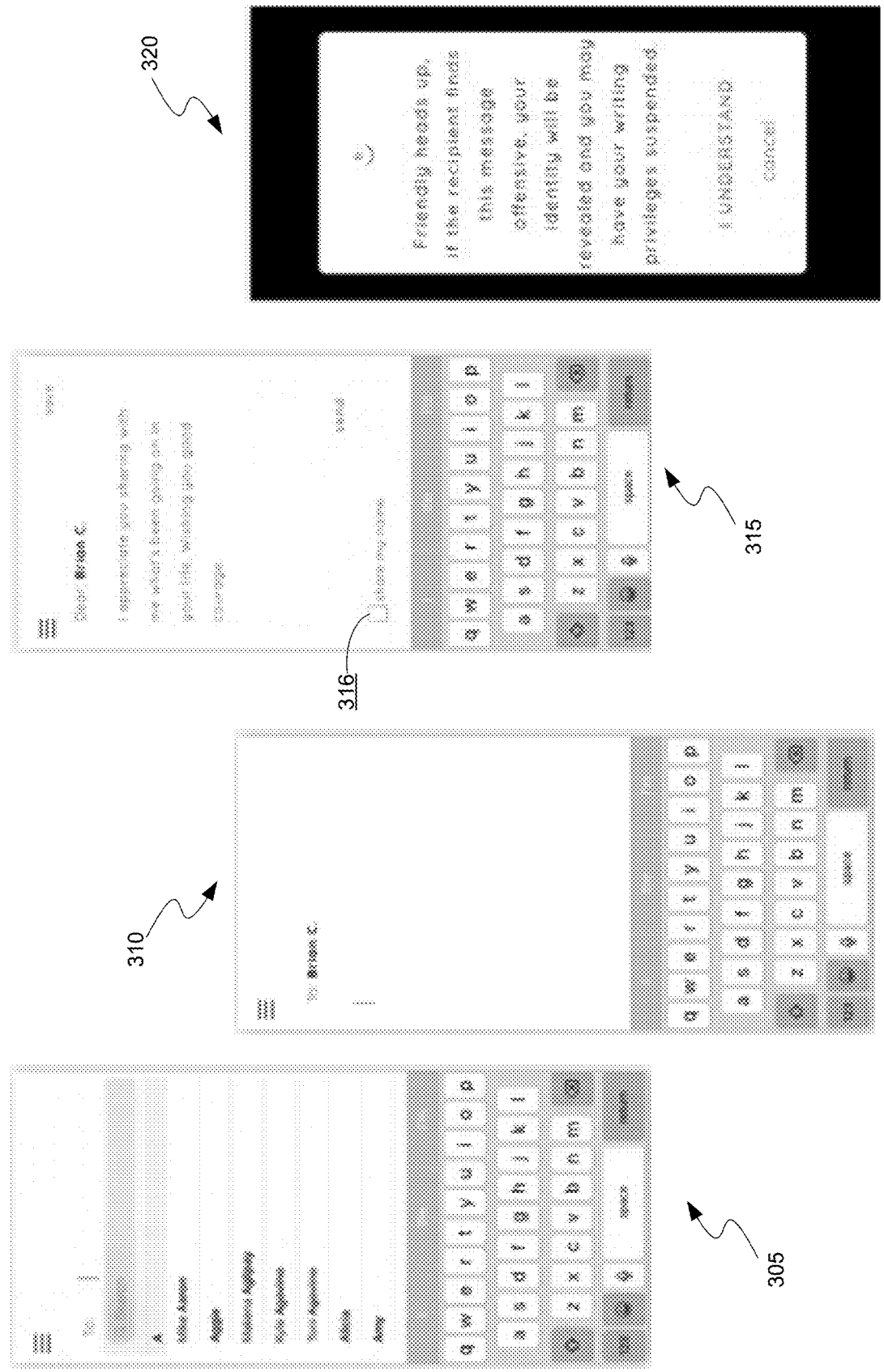
FIG. 3 shows example screenshots of the messaging app displaying contacts from an address book on a client device, consistent with various embodiments.

With respect to sending a message, in some embodiments, the messaging app lets the users 125 send messages to contacts in their address book on the client device. For example, the messaging app 146 enables the first user 126 to send messages to the contacts in the address book on the client device 136. That is, the first user 126 will be able to send a message 130 to a second user 127 if the contact information of the second user 127 is stored in the address book on the client device 136. FIG. 3 shows example screenshots of the messaging app displaying contacts from an address book on the client device, consistent with various embodiments. In some embodiments, the GUIs of FIG. 3 are part of the messaging app 146. The GUI 305 displays contacts from an address book of the first user 126 stored on the client device 136. The first user 126 may select one of the contacts, e.g., "Brian C." from the address book, as illustrated in the GUI 310. The first user 126 can then compose the message 130 and send it to the second user 127, as illustrated in the GUI 315. The message 130 can include text or multimedia content. However, in some embodiments, the message 130 is a text.

In some embodiments, the first user 126 can also choose to send the message 130 anonymously. For example, the GUI 315 shows an anonymous indicator 316, which when checked shares the user identifiable information (UII) of the first user 126 with the recipient along with the message 130, and when unchecked removes the UII from the message 130, thereby sending the message 130 anonymously. Further, in some embodiments, if a recipient finds a message to be offensive, the messaging app may show the UII to the recipient even if the message was sent anonymously. For example, if the first user 126 sends the message 130 to the second user 127 anonymously, and if the second user 127 found the message 130 to be offensive, the messaging app 147 can reveal the UII of the first user 126 to the second user 127 in the message. In some embodiments, this can act as a deterrent for sending offensive messages. The UII can include any information that can be used to identify or derive identity of the sender, such as a username, name of the user, telephone number, and email ID. The GUI 320 shows a note, which indicates that an identity of the sender will be revealed if the recipient finds the message to be offensive. In some embodiments, the note is shown only the first when the user sends an anonymous message.

While the messaging app 146, lets the first user 126 send messages to the contacts in the address book on the client device 136, in some embodiments, the messaging app 146 lets the first user 126 send a message to a contact that is not in the address book. The first user 126 may type in the contact information, such as a telephone number or email ID of the recipient rather than selecting from the address book. Further, regardless of whether the first user 126 can send messages to contacts that are not in the address book, the first user 126 may receive messages from contacts that are not in the address book of the first user 126.

With respect to receiving messages, the messaging app provides an option to the user to record a reaction of the user to reading the message. For example, when the second user 127 receives the message 130, the messaging app 147 can provide an option to the second user 127 to record a reaction 135 of the second user 127 to reading the message 130. The messaging app 147 provides this option prior to displaying the message 130 to the second user 127. If the second user 127 chooses to record the reaction 135, the messaging app 147 instructs a camera of the client device 137 to start a video recording of the second user 127 and then displays the message 130. The recording can happen in the background while the message 130 is displayed on a screen of the client device 137. The messaging app 147 records the video for a specified duration from the time the message is displayed, e.g., 30 seconds, 45 seconds, or 1 minute. Even after recording, the second user 127 can choose whether or not to send the reaction 135 to the first user 126. Further, the messaging app asks the second user 127 to indicate a type of the emotion the message 130 generated for the second user 127. The type of emotion can be a positive emotion, such as happiness, laughter, smile, joy, etc., or a negative emotion such as sad, disappointed, creepy, gross, or angry. The messaging app 147 can provide an indicator to indicate the type of emotion. For example, the positive emotion indicator can be an icon, a text, an image, a symbol or other representations of positive emotion, such as a "like" image, a thumbs up image, a smiley icon, a smile symbol, and the negative emotion indicator can be an icon, a text, an image, a symbol or other representations of negative emotion, such as a "dislike" image, a thumbs down image, a frown face icon, or a frown face symbol. By selecting one of these two indicators, the second user 127 can indicate the type of emotion generated by the message 130. For the sake of brevity, an indication of positive emotion is referred to as a "like," and an indication of a negative emotion is referred to as a "dislike." In some embodiments, if the second user 127 indicates that the message 130 generated a negative emotion, the messaging app 147 provides an option for the second user 127 to report the sender of the message 130, e.g., the first user 126, to the communication platform in the server 105. Upon receiving a report against the first user 126, the server 105 stores the report in the storage system 110, which can be used in determining whether to suspend the writing privileges of the first user 126.

Figure 4:
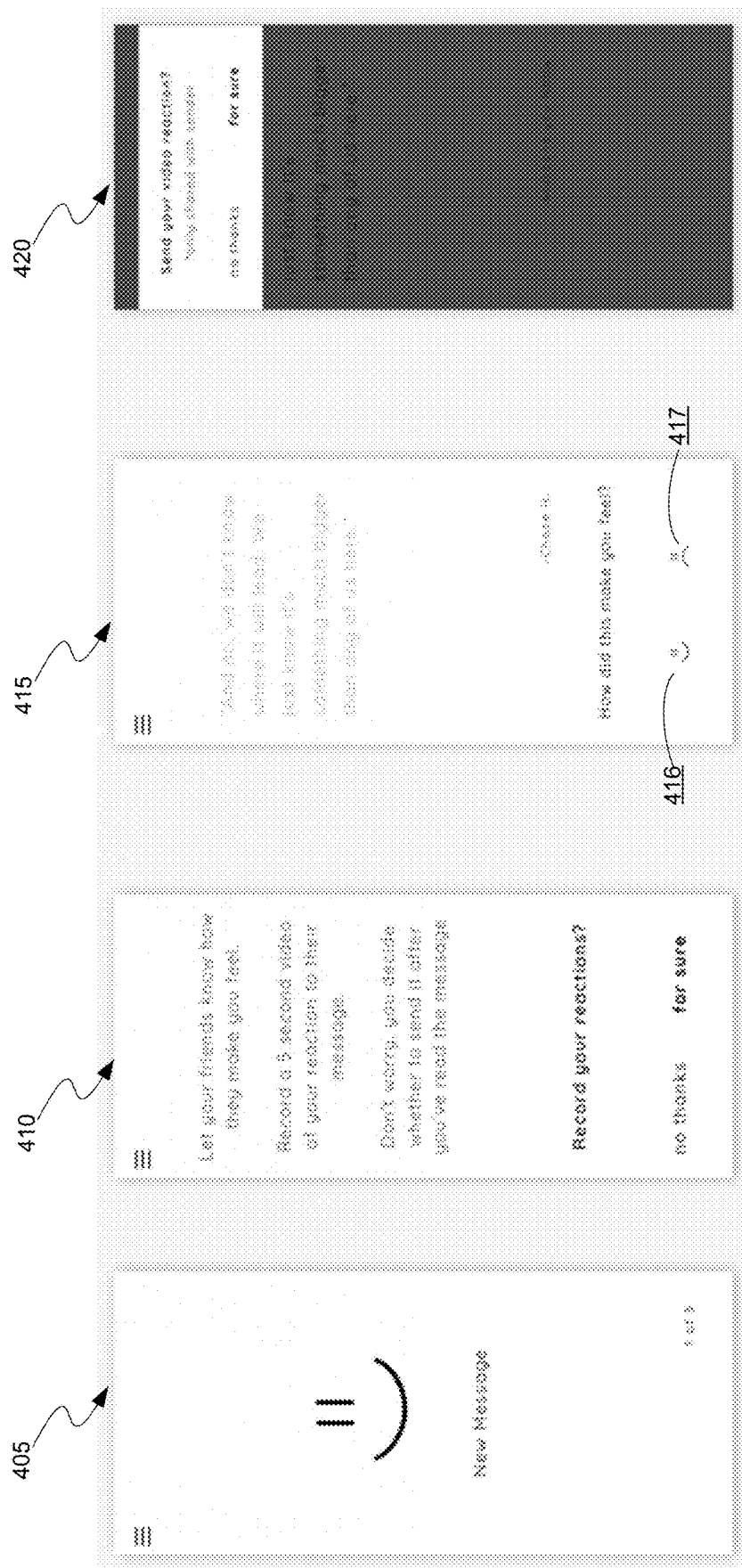
FIG. 4 shows example screenshots of the messaging app displaying a received message, consistent with various embodiments.

FIG. 4 shows example screenshots of the messaging app displaying a received message, consistent with various embodiments. In some embodiments, the GUIs of FIG. 4 are part of the messaging app 147. The GUI 405 displays a notification of a new message. The GUI 410 displays a prompt asking the second user 127 to confirm whether the second user 127 wants to record the reaction to reading the message 130. If the second user 127 confirms the recording of the reaction, the messaging app 147 instructs the camera of the client device 137 to start the video recording and then displays the GUI 415, which displays the message 130, otherwise the messaging app just displays the GUI 415. The GUI 415 also provides emotion indicators such as a positive emotion indicator 416 and a negative emotion indicator 417. The second user 127 can indicate the type of emotion generated by the message 130 by selecting one of the two emotion indicators 416 and 417. The GUI 420 displays a prompt asking the second user 127 to confirm whether the second user 127 wants to send the recording of the reaction 135 to the sender of the message 130, e.g., the first user 126. If the second user 127 confirms sending of the reaction, the reaction 135 is sent to the first user 126.

The messaging app 147 transmits the reaction 135 (if the second user 127 provided consent to sending) and the type of emotion to the server 105, which is then transmitted to the first user 126. The first user 126 can view the reaction 135 of the second user 127 and the type of emotion felt by the second user 127 in reading the message 130 in the messaging app 146. In some embodiments, the messaging app includes an inbox folder, which includes all messages received by a user, and an outbox folder which includes all messages sent by the user. For example, an inbox folder in the messaging app 146 associated with the first user 126, that can include all messages received by the first user 126, and an outbox folder that includes all messages sent by the first user 126. If any of the messages in these folders have an associated reaction, then those messages would also include the associated reaction which the first user 126 can playback anytime. For example, if the any of the messages in the inbox folder of the first user 126 has reactions of the first user 126 in reading those messages, those videos would be tagged to the message. A thumbnail or any other video indicator that is indicative of a video is displayed in association with the message, and the first user 126 can playback the video by selecting the video indicator. Similarly, if any message in the outbox folder has a reaction of a recipient of the message, the message is tagged with the video, and the first user 126 can playback the video by selecting the associated video indicator.

Figure 5:
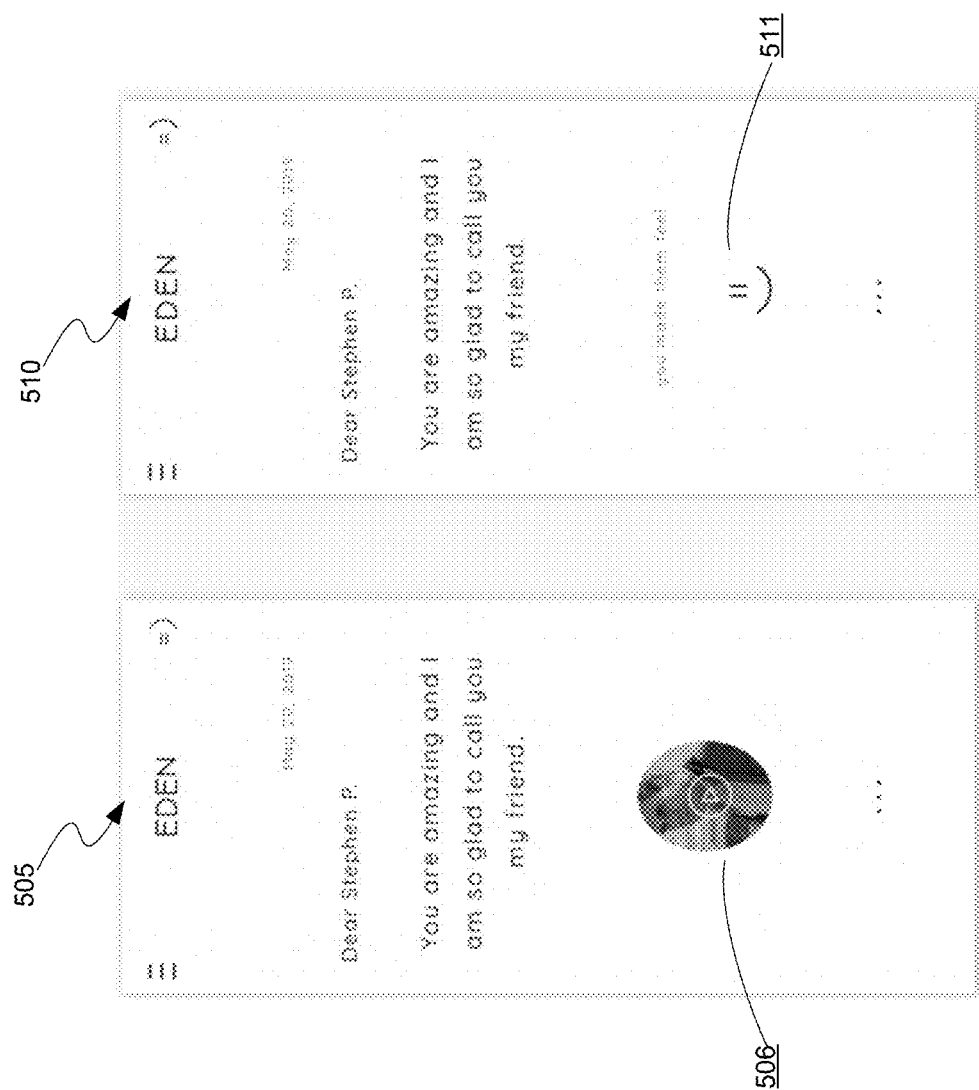
FIG. 5 shows example screenshots of a message in an outbox folder of a user, consistent with various embodiments.

FIG. 5 shows example screenshots of a message in an outbox folder of a user, consistent with various embodiments. In some embodiments, the GUIs of FIG. 5 are part of the messaging app 146. The GUI 505 shows a message in the outbox folder of a user, e.g., the first user 126, that is sent to another user "Stephen P." The message is also associated with a reaction of the recipient, which is indicated by the video thumbnail 506. The first user 126 can select the video thumbnail 506 to play the video. The GUI 510 shows the positive emotion indicator 511, which is indicative of type of emotion, e.g., positive emotion, felt by the recipient in reading the message from the first user 126.

The communication platform facilitates a user in strengthening existing relationships. The communication platform categorizes the contacts in the address book of a user into multiple categories, each of which is representative of a relationship type of the user with the contacts in those categories. In some embodiments, the communication platform categorizes the contacts based on a degree of interaction between the users in the communication platform.

Figure 6:
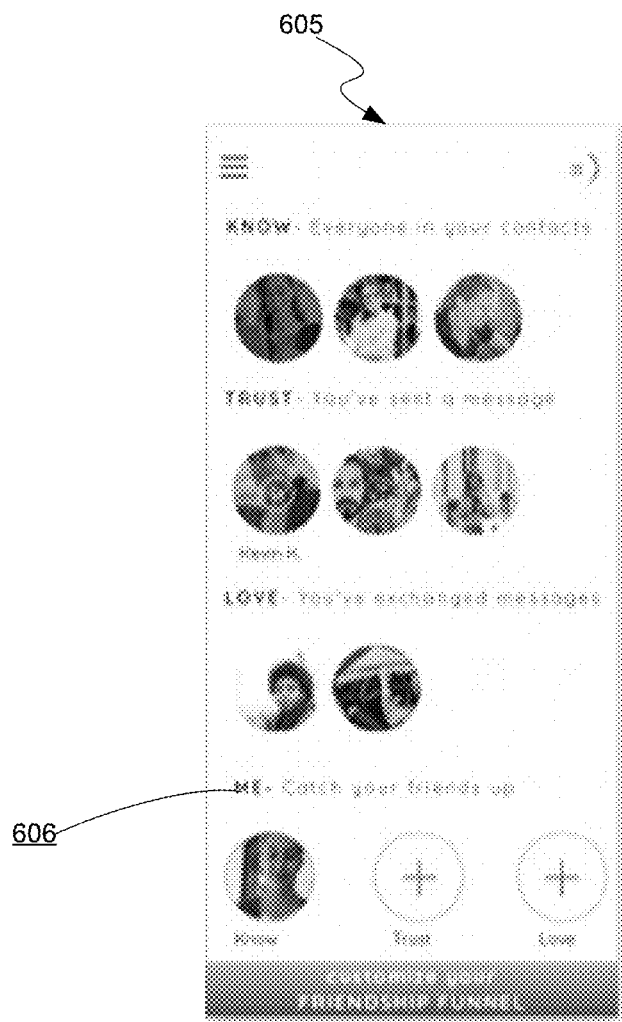
FIG. 6 shows an example screenshot of categorization of address book contacts of a user, consistent with various embodiments.

FIG. 6 shows an example screenshot of categorization of address book contacts of a user, consistent with various embodiments. In some embodiments, the GUIs of FIG. 6 are part of the messaging app 146. The messaging app 146 categories the contacts in the address book of the first user 126 into a "know," "trust" and "love" category as illustrated in the GUI 605. In some embodiments, the "know" category includes all contacts from the address book of the first user 126. In some embodiments, the "trust" category includes those contacts from the address book to whom the first user 126 has sent a message. In some embodiments, the "trust" category includes those contacts from the address book with whom the first user 126 has exchanged messages (e.g., sent messages to and received messages from). While the messaging app 146 can automatically categorize the contacts, the first user 126 can also assign one of the above categories to a specified contact. Further, the specified contact can move from one category to another if the interaction of the first user 126 with the specified contact changes. For example, the specified contact may initially be in "know" category but may move to "trust" category when the first user 126 sends a message to the specified contact, and may further move to the "love" category when the first user 126 and the specified user have exchanged messages. In some embodiments, the messaging app 146 can transmit the categorization information of the contacts to the server 105, which can store the categorization information in the storage system 110, e.g., in an encrypted format.

In some embodiments, the criteria to assign a specified contact to a specified category can be user-defined. For example, the degree of interaction with the specified contact, e.g., the number of messages that the first user 126 has to send to the specified contact, for the specified contact to be categorized into "trust" category can be user-defined. Similarly, the number of messages to be exchanged between the first user 126 and the specified contact for the specified contact to be categorized into "love" category can be user-defined.

Such categorization can encourage the user to strengthen a specified relationship. For example, the first user 126 can look at the categorization and see that a specified contact, "Kevin", is in the "trust" category and may feel that they haven't communicated with each other in a while and therefore, get encouraged to exchange messages with him. Upon exchanging messages with "Kevin," "Kevin" may be moved to the "love" category.

The messaging app 146 also allows the first user 126 to share "catchup" videos with his/her contacts. In some embodiments, a "catch-up" video is a video recording having some information of the first user 126. For example, the catch-up video of the first user 126 can be a video of the first user 126 providing some information about what's happening with the first user 126, which helps his/her contacts catch up with the first user 126. The first user 126 can generate different catch-up videos for different categories, e.g., having varying degree of personal information in the messaging app 146 as illustrated in the GUI 605 by catch-up video section 606. For example, the first user 126 can create a first catch-up video and assign to the "know" category, create a second catch-up video and assign to the "trust" category, and create a third catch-up video and assign to the "love" category. In some embodiments, the catch-up video generated for the "love" category can have more personal information about the first user 126 than the catch-up video generated for the "trust" category as the first user 126 has a closer and stronger relationship with contacts in the "love" category than in the "trust" category. Also, the allotted duration of catch-up video recording for different categories can be different. For example, the allotted duration for the catch-up video can be the highest for the "love" category and the lowest for the "know" category. In the catch-up video section 606, the first user 126 has generated a catch-up video only for the "know" category. When a specified contact of the first user 126 requests for viewing a catch-up video of the first user 126, the messaging app determines the category to which the specified contact belongs and provides access to the catch-up video of the first user 126 that is assigned to the determined category. The specified contact may not have access to catch-up videos of the first user 126 assigned to categories other than the one to which the specified contact belongs. In some embodiments, the messaging app installed a client device associated with the specified contact may interact with the server 105 to find the categorization of the specified contact in the first user's 126 messaging app.

Similarly, when the first user 126 requests for viewing a catch-up video of a contact, such as "Kevin," e.g., by tapping on the thumbnail of the contact in the "know category," the messaging app 146 determines the category to which the first user 126 belongs in Kevin's messaging app and provides access to the catch-up video of Kevin that is assigned to the category of the first user 126. In some embodiments, the messaging app 146 may indicate a number of the catch-up videos viewed by the first user 126, e.g., as a percentage of a total number of catch-up videos of the contacts accessible by the first user 126, such as 60% of catch-up videos viewed."

The communication platform also lets users post or publish messages ("public post" or "public message") that can be viewed by all users of the communication platform. Users can also tag or include videos in their public posts. A video tagged to a public post can be a video recording of what's on a user's mind or what the user feels about another public post. In some embodiments, the public posts are displayed anonymously, that is, the messaging app removes the UII of the user who posted the public post or commented on the public post.

Figure 7:
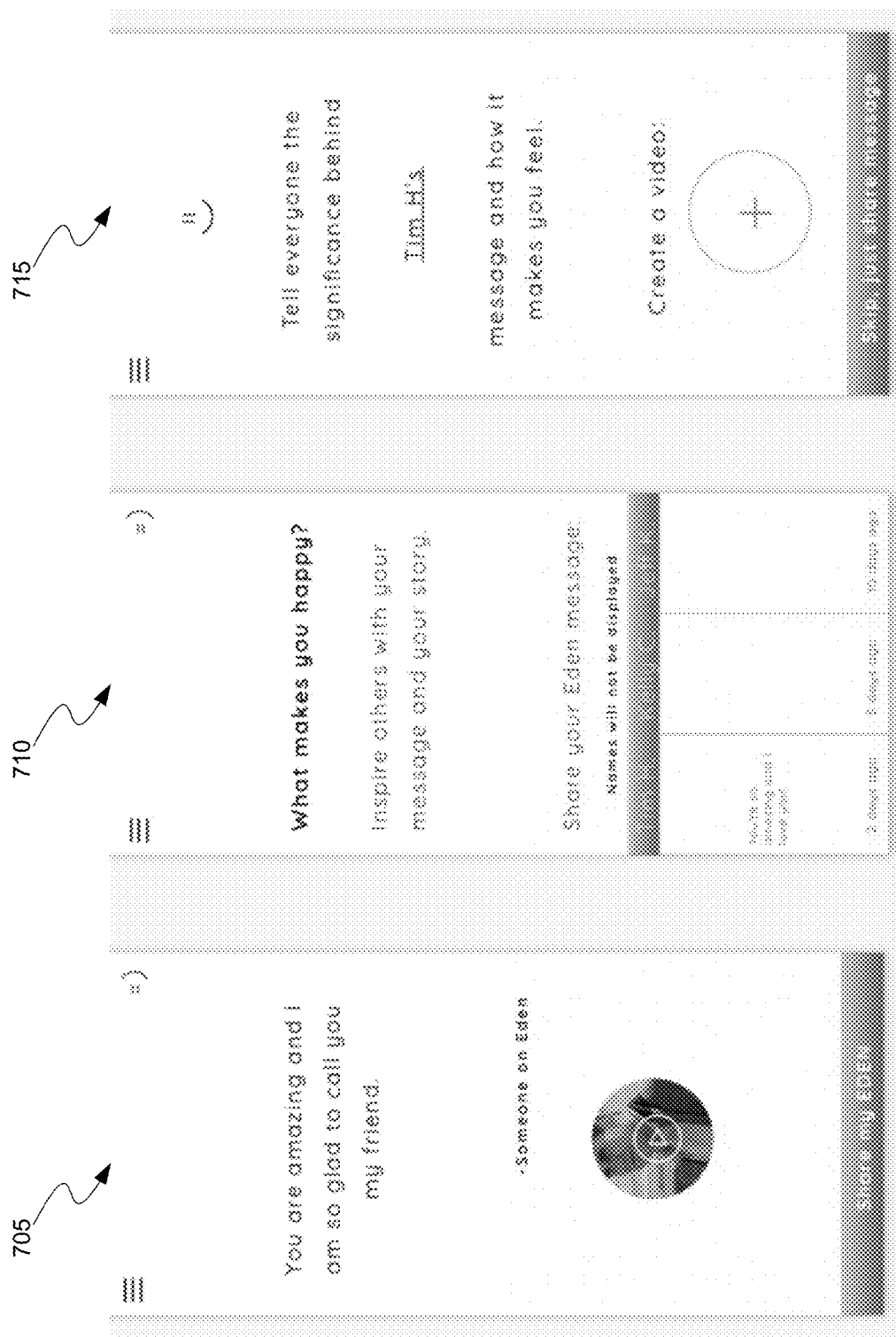
FIG. 7 shows example screenshots of public posts, consistent with various embodiments.

FIG. 7 shows example screenshots of public posts, consistent with various embodiments. In some embodiments, the GUIs of FIG. 7 are part of the messaging app 146. The GUI 705 displays a public post by a user of the communication platform. The GUI 710 displays public posts by multiple users of the communication platform. The first user 126 can choose to comment on one of the public posts. The GUI 715 allows the first user 126 to comment on one of the public posts displayed in the GUI 710. The first user 126 may also choose to add a video to the comment, as illustrated in the GUI 710.

Referring back to FIG. 1 and as described above, the communication platform not only promotes spreading positive emotion between users, but also aids in strengthening an existing relationship between users. The communication platform restricts users found to be in violation of the social contract from sending messages by suspending their writing privileges. The server 105 stores various types of data regarding the users 125 in the storage system 110, such as user profile information of the users (e.g., name, telephone number, email ID, profile picture), the messages exchanged between the users, a like or dislike received for each of the messages, any reports received against the users, reaction videos of the users, and at least some information regarding contact categories of each of the users 125. The server 105 tracks various metrics for each of the users 125 in determining whether to suspend the writing privileges for a user. For example, a metric can include one or more of a number of times a specified user has received dislikes from a particular user, a number of times a specified user has received dislikes from one or more of the users 125, a percentage of messages sent by the specified user that received dislikes, a total number of messages sent by the specified user, a period for which the specified user has been active on the communication platform, a number of times the specified user is reported to the communication platform, a frequency at which a dislike is received (e.g., how many dislikes per week/month, per 100 messages), a frequency at which the specified user is reported, and such. The server 105 can define threshold limits for each metric or a combination of the metrics. The server 105 can suspend the writing privileges of the specified user when one or more metrics exceed their thresholds. Suspending the writing privileges can prevent the specified user from sending messages and therefore, can stop spreading of negative emotions by the specified user. After the suspension, the specified user may continue to receive messages from other users, but would not be able to send messages to other users. In some embodiments, the suspended user can appeal to the communication platform to regain writing privileges.

FIG. 8 shows the prompts that a user would see when their messages are being reported for having negative content. Sample prompts 800 includes reminder 801, warning 802, and suspension 803. Furthermore, although FIG. 8 uses the term "messages", a person of skill in the art would understand that the prompts in FIG. 8 can be applied to shared videos, files, and other shareable content.

A user can receive reminder 801 when there has been one report against the user's messages. The user can then acknowledge receipt of reminder 801 and continue to use the communication platform. Warning 802 is displayed when the user has received two reports. In this case, the communication platform again notifies the user of the two reports and warns that an additional report will result in suspension of writing privileges. Again, the user can acknowledge receipt of warning 802 and continue to use the communication platform. If the user receives a third report, the user will receive a notice of suspension 803. Suspension 803 informs the user that their writing privileges are suspended.

In some embodiments, for a user to progress from reminder 801 to warning 802 to suspension 803, the user must be reported by different users. For example, user A can send three negative messages to user B. User B can then report all three messages to the communication platform. In which case, user A can now be presented with reminder 801 because the reports were all made by the same user. Conversely, if user A sent one video to user B, a message to user C, and a video to user D, and all three recipients report user A, then user will receive suspension 803.

In some embodiments, prior to suspending a user's writing privileges, the reported messages may be analyzed through sentiment analysis. Sentiment analysis can include methods known in the art such as natural language processing, text analysis, computational linguistics, and biometrics to identify whether the user's writing privileges should be suspended. For example, the communication platform may use IBM Watson technology to perform sentiment analysis. In another example, sentiment analysis can include a scoring technique wherein each word, phrase, expression, or facial feature that indicates a negative message can be summed to arrive at a negative-ness score. Upon which, if the negative-ness score exceeds a pre-determined threshold, then the user's writing privileges can be suspended.

In some embodiments, upon receiving suspension 803, the user is given the option to apologize to the reporters. If the user decides to apologize, the communication platform may display identifiable information of the three reporters. The user can then select which reporter to apologize to. In some embodiments, the reporters may be anonymous. The communication platform may only display generic prompts such as "reporter 1", "user 1", or the like.

Figure 9:
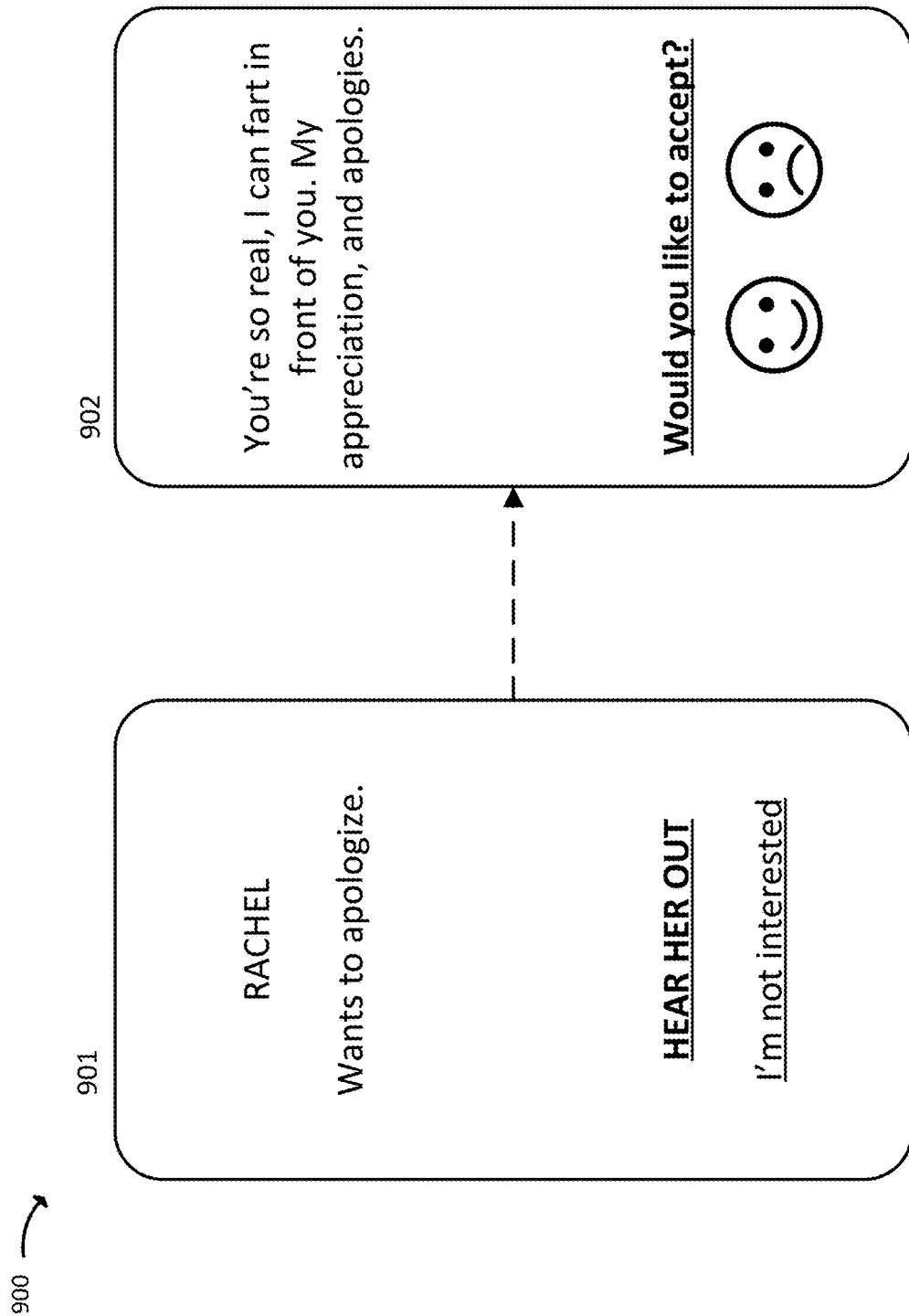
FIG. 9 shows example screen shots of the prompts the reporting user may see when the reported user chooses to apologize.

FIG. 9 shows screen shots of the prompts the reporting user may see when the reported user chooses to apologize. Apologize prompts 900 includes apology preview 901 and apology 902. In some embodiments, apology preview 901 shows the name of the user that was reported and indicates that they want to apologize. Moreover, apology 901 gives the recipient the option to view the apology or to ignore the apology. In some embodiments, the reported user may receive a notification of the recipient's selection.

If the recipient chooses to view the apology by selecting, for example, "HEAR HER OUT," then apology 902 is displayed. In some embodiments, apology 902 is a written message with the option to accept or decline the apology. In some embodiments, apology 902 can be a video, music, or other shareable content. Moreover, the accept or decline prompts can be shown in various ways such as by emoticons, text, icons, or the like.

In some embodiments, if the recipient accepts the apology, the report that was made by the recipient against the reported user can be cancelled. For example, user A can be reported once by each of user B, user C, and user D. Thus, user A can have their writing privileges be suspended. However, user A can apologize to user B, and user B can accept the apology. Once accepted, user A's writing privileges can be reinstated because user A only has two valid reports on their name.

FIG. 10 shows a prompt a user may receive after recording a video or writing a message. Thank you prompt 1000 includes record prompt 1001. In some embodiments, the communication platform displays record prompt 1001 after a user has recorded a video or written a message. Record prompt 1001 can request the user to record a thank you video or write a thank you message, which can be played or displayed when a recipient indicates that the video or message made them feel positive (i.e., smile or laugh). For example, user A can write a joke and proceed through prompts on the communication platform to send the joke to user B. User B may then indicate that the joke made them smile. Once indicated, user A may receive record prompt 1001 to record a thank you video or write a thank you message. In some embodiments, record prompt 1001 may be displayed prior to sending a video or message to a recipient.

Figure 11:
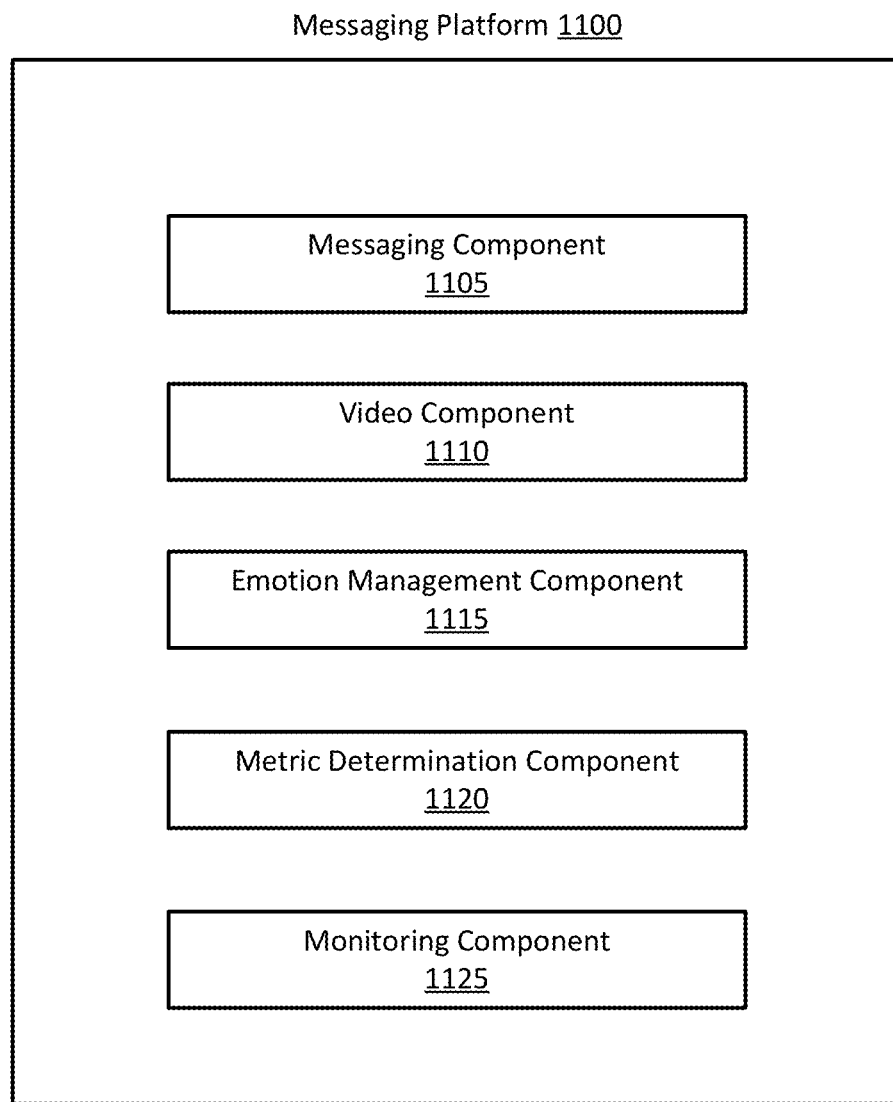
FIG. 11 is a block diagram of a communication platform, consistent with various embodiments.

FIG. 11 is a block diagram of a communication platform, consistent with various embodiments. The communication platform 1100 includes a messaging component 1105, a video component 1110, an emotion management component 1115, a metric determination component 1120, and a monitoring component 1125. The messaging component 1105 facilitates in exchanging messages between users 125, e.g., sending a message from one user to another user. The video component 1110 facilitates in recording videos, such as reactions and catch-up videos. The emotion management component 1115 determines the type of emotion generated by the messages exchanged in the communication platform 1100. The metric determination component 1120 can determine various metrics associated with the users 125, e.g., for monitoring the adherence of the users 125 to the social contract of the messaging 1100 platform. The monitoring component 1125 can monitor the adherence of the users 125 to the social contract of the messaging 1100 platform and suspend writing privileges of the users found violating the social contract.

The communication platform 1100 can be implemented in a distributed architecture. That is, the components of the communication platform 1100 can be distributed across multiple entities. For example, some components can be implemented on the server 105 and some in the client-side portion, e.g., in the messaging app. In another example, all the components can be implemented in both the server 105 and the client-side portion.

Additional details with respect to the components of the communication platform 1100 are described at least with reference to FIGS. 9 and 10 below. Note that the communication platform 1100 illustrated in FIG. 11 is not restricted to having the above described components. The communication platform 1100 can include lesser number of components, e.g., functionalities of two components can be combined into one component, or can include more number of components, e.g., components that perform other functionalities. In some embodiments, the functionalities of one or more of the above components can be split into two or more components.

Figure 12:
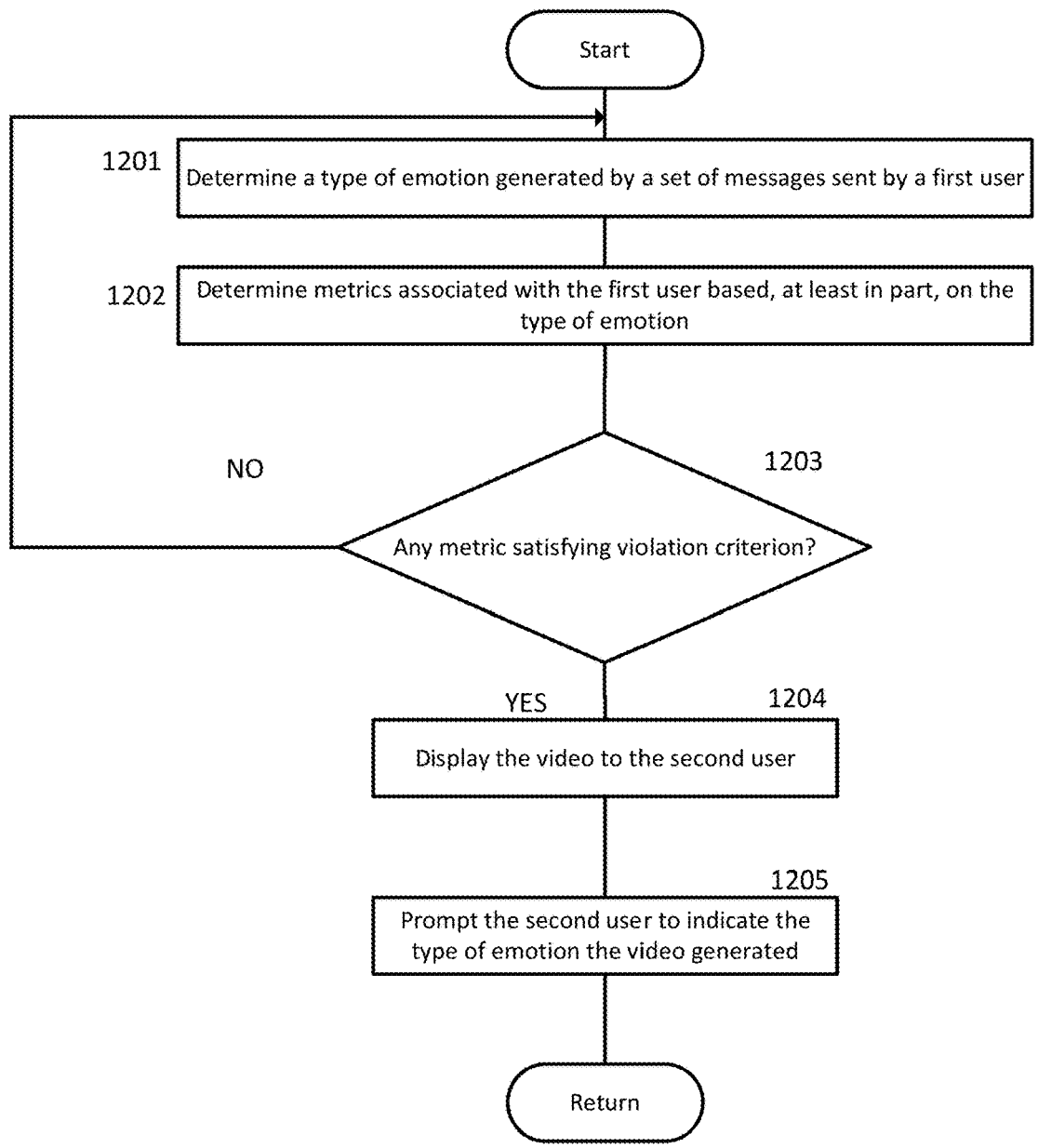
FIG. 12 is an example flow diagram for receiving a reaction video, consistent with various embodiments.

FIG. 12 is a flow diagram of a process 1200 for managing users in a communication platform, consistent with various embodiments. In some embodiments, the process 1200 can be implemented in the environment 100 and using the communication platform 1100 of FIG. 11. At block 1201, the emotion management component 1115 determines a type of emotion generated by a set of messages sent by a user, e.g., the first user 126. In some embodiments, the type of emotion generated by a particular message from the first user 126 is indicated by a recipient of the particular message, e.g., as described at least with reference to FIGS. 1 and 4.

At block 1202, the metric determination component 1120 determines one or more metrics associated with the first user 126. In some embodiments, the metrics can be based on the type of emotion. As described at least with reference to FIG. 1, a metric can include one or more of a number of times a specified user has received dislikes from a particular user, a number of times a specified user has received dislikes from one or more of the users 125, a percentage of messages sent by the specified user that received dislikes, a total number of messages sent by the specified user, a period for which the specified user has been active on the communication platform, a number of times the specified user is reported to the communication platform, a frequency at which a dislike is received (e.g., how many dislikes per week/month, per 100 messages), a frequency at which the specified user is reported, and such.

At block 1203, the monitoring component 1125 determines if any of the metrics satisfies the criterion for violation. The monitoring component 1125 can define threshold limits for each metric or a combination of the metrics. In some embodiments, the criterion can be that one or more metrics exceed one or more thresholds. For example, one criterion can be that a first metric exceeds a first threshold and a second metric exceeds a second threshold. In another example, the criterion can be that at least one of the first metric and the second metric exceeds a corresponding threshold. If the monitoring component 1125 determines that none of the metrics satisfy the violation criterion, the emotion management component 1115 continues to monitor the type of emotion received for the messages sent by the first user 126.

On the other hand, if the monitoring component 1125 determines that one or more of the metrics satisfy the violation criterion, at block 1204, the monitoring component 1125 determines that the first user 126 violated the social contract of the communication platform 1100.

At block 1205, the monitoring component 1125 suspends the writing privileges of the first user 126. Suspending the writing privileges can prevent the first user 126 from sending messages and therefore, can stop spreading of negative emotions by the first user 126.

While the above process 1200 is described with respect to a single user, e.g., the first user 126, in some embodiments, the process 1200 is executed for each of the users 125.

Figure 13:
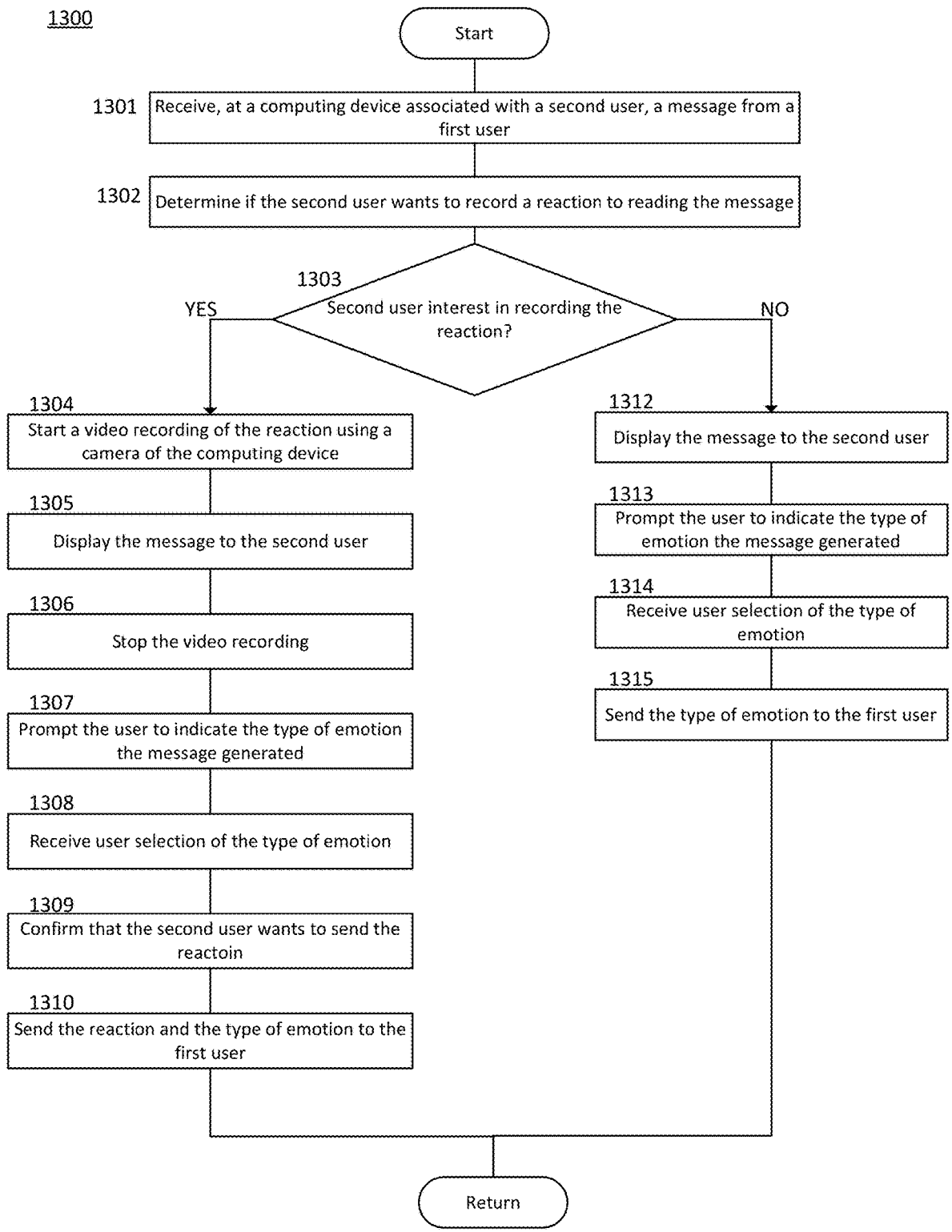
FIG. 13 is an example block diagram of a processing system that can implement operations of the disclosed embodiments.

FIG. 13 is a flow diagram of a process 1300 for displaying a message to a user, consistent with various embodiments. In some embodiments, the process 1300 can be implemented in the environment 100 of FIG. 1 and using the communication platform 1100 of FIG. 11. At block 1301, the messaging component 1105 receives a message at a client device associated with a user. For example, the messaging component 1105 in the client device 137 associated with the second user 127 receives the message 130 from the first user 126.

At block 1302, the video component 1110 determines if the second user 127 is interested in recording a reaction to reading the message 130. For example, the video component 1110 can display a prompt that asks if the second user 127 is interested in recording the reaction.

At determination block 1303, if the second user 127 indicated interest in recording the reaction, the process 1300 proceeds to block 1304, where the video component 1110 starts a video recording using the camera, e.g., front-facing camera of the client device 137, to record the reaction of the second user 127, as described at least with reference to FIG. 4.

At block 1305, the messaging component 1105 displays the message 130 to the second user 127. The second user 127 may react to the message 130 by exhibiting some emotion while reading the message 130, e.g., a smile, a grin, a frown, surprise, confused, through facial expressions or other body language. The emotion is captured in the video recording as the reaction 135.

At block 1306, the video component 1110 stops the video recording. In some embodiments, the video component 1110 continues to record the video for a specified duration after the message 130 is displayed. In some embodiments, the starting and stopping of the recording is done automatically by the video component 1110. That is, the second user 127 may not have to manually start or stop the recording, and the recording can happen in the background while the second user 127 is reading the message 130 displayed on a display screen of the client device 137. This way, the reaction 135 can be a candid video of the reaction of the second user 127.

At block 1307, the emotion management component 1115 generates a prompt on the client device 137 asking the second user 127 to identify the type of emotion the message 130 generated for the second user 127. In some embodiments, the emotion management component 1115 can display a positive emotion indicator 416 and a negative emotion indicator 417, which the second user 127 can use to indicate the type of emotion, as described at least with reference to FIG. 4.

At block 1308, the emotion management component 1115 receives a user selection of the type of emotion.

At block 1309, the video component 1110 confirms that the second user 127 is still interested in sending the reaction 135 to the first user 126. For example, the video component 1110 can display a prompt asking the second user 127 to confirm if the second user 127 wants to send the reaction 135 to the first user 126.

At block 1310, the messaging component 1105 transmits the reaction 135 and the type of emotion to the first user 126 upon receiving the confirmation from the second user 127. In an event the second 127 does not confirm sending of the reaction, then the messaging component 1105 transmits the type of emotion but not the reaction 135.

Referring back to determination block 1303, if the second user 127 is not interested in recording the reaction, the process proceeds to block 1311, where the messaging component 1105 displays the message 130 to the second user 127.

At block 1312, the emotion management component 1115 generates a prompt on the client device 137 asking the second user 127 to identify the type of emotion the message 130 generated for the second user 127, e.g., as described with reference to block 1307.

At block 1313, the emotion management component 1115 receives a user selection of the type of emotion.

At block 1314, the messaging component 1105 transmits the type of emotion to the first user 126.

Figure 14:
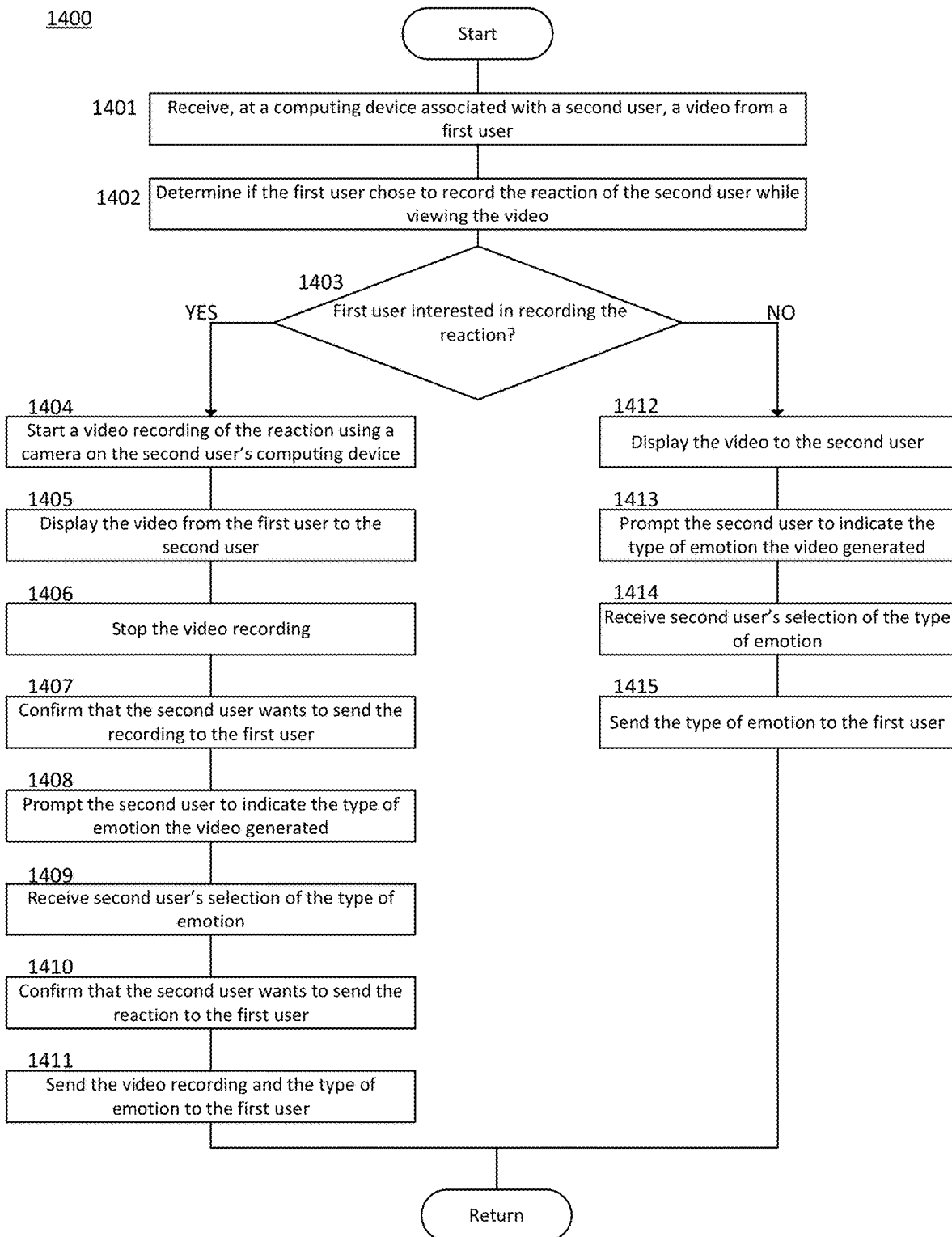
FIG. 14 is an example flow diagram of a process for displaying a video to a user and receiving a reaction video, consistent with various embodiments.

FIG. 14 is a flow diagram of a process 1400 for displaying a video to a user and receiving a reaction video, consistent with various embodiments. In some embodiments, the process 1400 can be implemented in the environment 100 and using the communication platform 1400 of FIG. 11. At block 1401, the messaging component 1405 can receive a video at a client device associated with a user. The messaging component 1405 can be used to send text, videos, pictures, etc. For example, the messaging component 1405 in the client device 137 associated with the second user 120 receives a video from the first user 126.

In some embodiments, at block 1401, a user may select the video they want to view. For example, the messaging app 147 can include a library of content that users have made public, rather than sending to a particular individual(s). Thus, a user can select the video they want to view. In some embodiments, the video can be organized based on characteristics of the videos. For example, a video can be categorizes based on the emotion that it is intended to induce, the content, the geographic area where it was made, and other criterion. For example, user A may want to view videos to make them motivated to finish a work out. Thus, user A may filter the videos to "motivational." In some embodiments, the library can include categorized messages. For example, user B may want to a read a joke. Thus, user B can filter the messages to only show "funny" messages.

At block 1402, the video component 1410 can determine if the first user 126 indicated interest in recording a reaction video of second user 127. For example, the video component 1410 can display a prompt that asks if the second user 127 grants permission to record the reaction video. Additionally, first user 126 may be asked prior to sending the video the second user 127, whether a reaction video should be requested. First user 126 may have the option of asking for a reaction video while watching the video, after watching the video, or while watching only a portion of the video. For example, first user 126 may record a three-minute video to send to second user 127. Within the three-minute video, the first user 126 may indicated that a reaction video should be recorded only during the last thirty seconds of the video. Additionally, first user 126 may request reaction videos for multiple portions of the video. For example, the first thirty seconds and last thirty seconds of a three-minute video.

At determination block 1403, if the first user 126 indicated interest in recording the reaction video, the process 1400 proceeds to block 1404, wherein the video component 1410 starts a recording using the camera. The camera can be facing the second user 127 and can be front-facing camera or rear-facing camera. It can record the reaction of second user 127, as described at least with reference to FIG. 4.

In some embodiments, prior to block 1404, the second user may be given the option to grant or decline permission to start recording the reaction video. In some embodiments, block 1405 may be executed prior to block 1404, or vice a versa, depending on when the first user 127 wanted to record to the reaction video. For example, if the first user 127 wanted to record to reaction video for only the last thirty seconds of a three-minute video, then block 1405 will precede block 1404.

At block 1405, the messaging component 1405 displays the video to second user 127. Second user 127 may react to the video by exhibiting one or more emotion(s) while viewing the video, e.g., smile, laugh, frown, glare, or other body language. The emotion(s) is captured in the reaction video as reaction 135.

At block 1406, the video component 1410 stops recording. In some embodiments, video component 1410 continues to record the video for a specified duration after the video is completed. In some embodiments, the starting point and ending point of the recording is dictated by the first user 126, as mentioned above. This way the reaction 135 can be a candid video of the second user 127.

At block 1407, the messaging component 1405 generates a prompt to confirm that the second user 127 wants to send the reaction video to the first user 126. In some embodiments, block 1407 can be optional. For example, first user 126 can request a reaction video but give second user 127 discretion to decide whether or not to send the video. In some embodiments, sending the reaction video can be a requirement for viewing the video.

Blocks 1408, 1409, and 1410 function similarly to block 1308, 1309, and 1310, respectively, of FIG. 13.

Referring back to determination block 1403, if the first user 126 is not interested in recording the reaction, the process proceeds to block 1412.

Blocks 1412, 1413, 1414, and 1415 function similarly to blocks 1311, 1312, 1313, and 1314, respectively, of FIG. 13.

Figure 15:
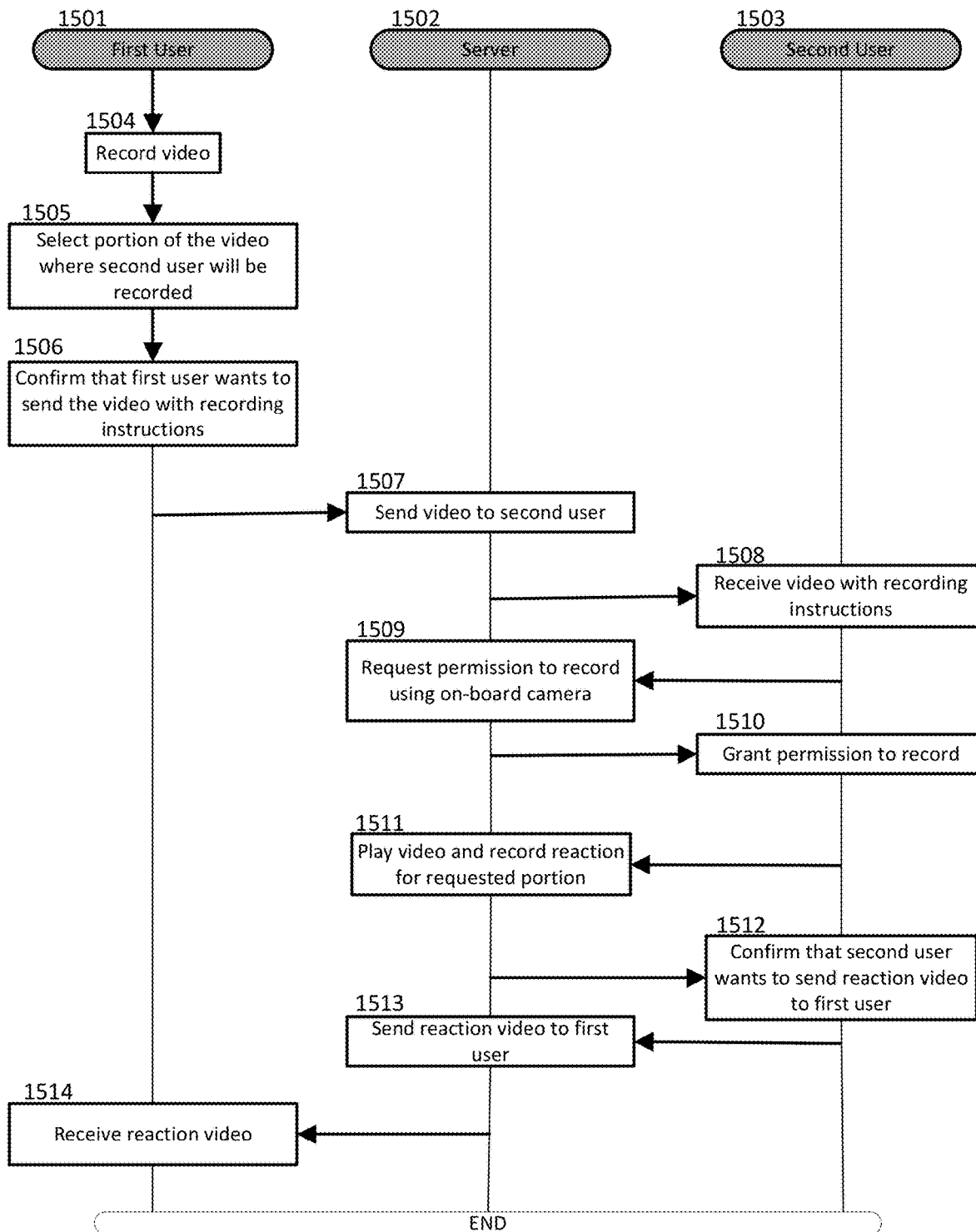
FIG. 15 is an example flow diagram of the process for receiving a reaction video for a portion of a video, consistent with various embodiments.

FIG. 15 is a flow diagram of the process 1500 for receiving a reaction video for a portion of a video, consistent with various embodiments. In some embodiments, the process 1500 can be implemented in the environment 100 and using the communication platform 1100 of FIG. 11. A first user 1501 can record a video 1504 using a personal device, e.g., phone, tablet, computer, camera, or the like. First user 1501 can record the video while within the environment of the communication platform 1100 of FIG. 11 or upload the video onto the communication platform 1100 of FIG. 11 from a different source, e.g., local storage, USB, WiFi, etc.

At block 1505, first user 126 can select the one or more portion(s) of the video for which a reaction video should be recorded. Block 1505 functions similarly to similar blocks, e.g., block 1302, of FIG. 13. For example, first user 1501 can select the last thirty seconds of a three-minute to record a reaction video. In another example, first user 1501 can chose to record a reaction video for the entirety of the video.

At block 1506, the messaging component 1105 generates a prompt on client device 137 confirming that first user 1501 wants to send the video with instructions for recording a reaction video to the second user 1503. Once confirmed, server 1502 sends video to second user at block 1507.

At block 1508, the second user 1503 receives the video with reaction recording instructions. In some embodiments, the messaging platform 1100, on which process 1500 may be performed, may perform block 1509. At block 1509, server 1502 can executed instructions to request permission to record using an onboard camera. Subsequently, second 1503 can grant permission to record, as per block 1510.

At block 1511, server 1502 executed instructions to play the video and record a reaction video for the requested portion, as per block 1511. After the video has finished playing, or when the recording has finished, second user 1503 can confirm that the reaction video should be sent to first user 1501, as per block 1512. Subsequently, server 1502 sends the reaction video to the first user, as per block 1513. In block 1514, first user 1501 receives the reaction video, as per block 1514.

In some embodiments, the second user 1503 can request a reaction video from the first user 1501 for the reaction video sent by the second user 1503. For example, first 1501 can send second user 1503 a five-minute video with instructions to record a reaction video for the first two minutes. After agreeing, to record the reaction video, the second user 1503 may be prompted by the messaging platform 1100, if the first user should record a reaction video to the reaction video sent by the second user 1503.

Figure 16:
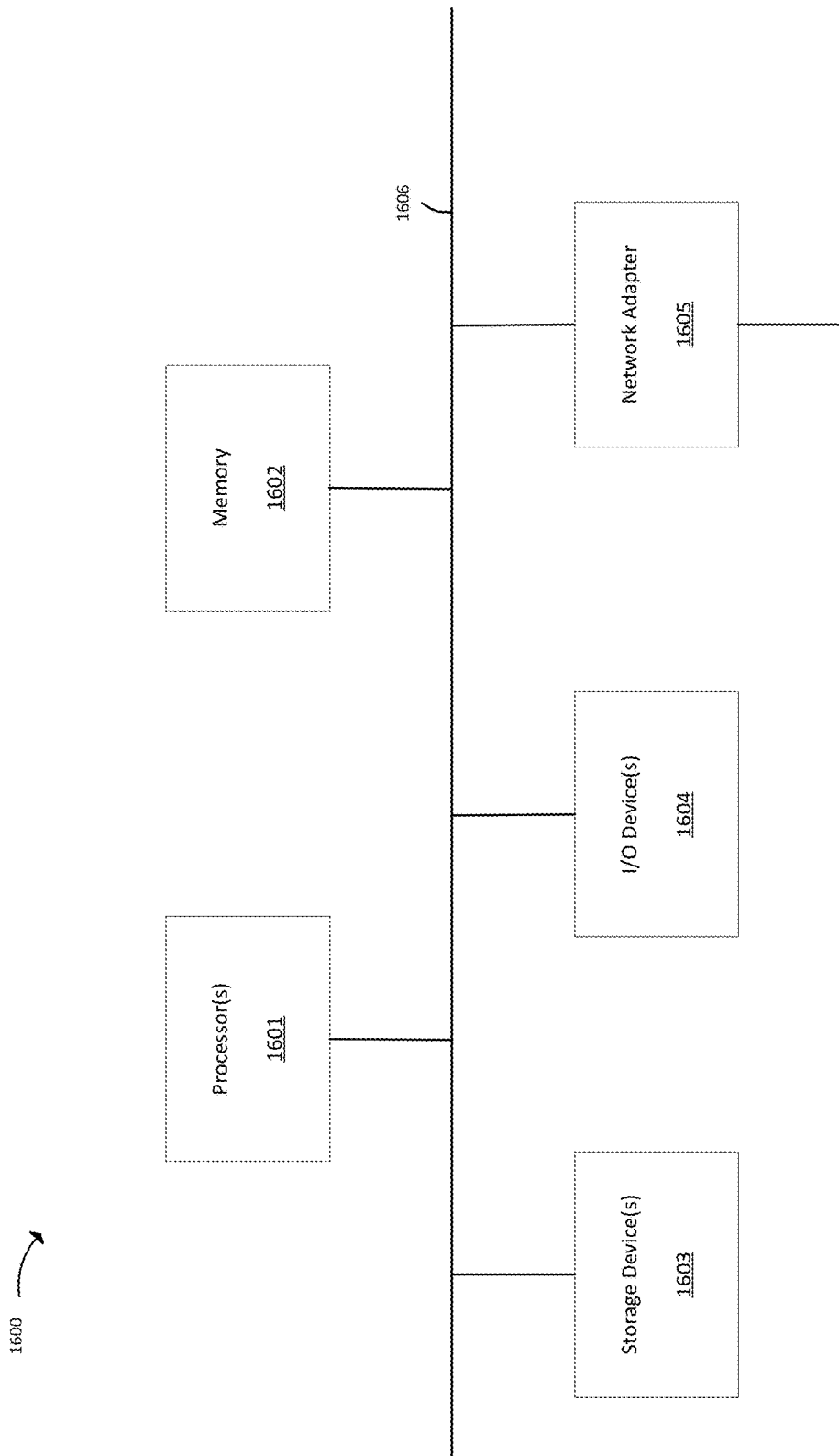
FIG. 16 is a block diagram of a computer system as may be used to implement features of the disclosed embodiments.

FIG. 16 is a block diagram of a computer system as may be used to implement features of the disclosed embodiments. The computing system 1600 may be used to implement any of the entities, components or services depicted in the examples of the foregoing figures (and any other components described in this specification). The computing system 1600 may include one or more central processing units ("processors") 1601, memory 1602, input/output devices 1604 (e.g., keyboard and pointing devices, display devices), storage devices 1603 (e.g., disk drives), and network adapters 1605 (e.g., network interfaces) that are connected to an interconnect 1606. The interconnect 1606 is illustrated as an abstraction that represents any one or more separate physical buses, point to point connections, or both connected by appropriate bridges, adapters, or controllers. The interconnect 1606, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1602 and storage devices 1603 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1602 can be implemented as software and/or firmware to program the processor(s) 1601 to carry out actions described above. In some embodiments, such software or firmware may be initially provided to the processing system 1600 by downloading it from a remote system through the computing system 1600 (e.g., via network adapter 1605).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein.

Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The invention claimed is:

1. A method for reaction recording generation and transmission, comprising:
   receiving, from a first computing device, both a video and a request for a recording during output of a specified portion from the video on a second computing device;
   requesting, on the second computing device, consent from a user of the second computing device to capture the recording during the output of the specified portion, wherein the consent grants permission for a camera on board the second computing device to capture the recording when the specified portion is output on the second computing device and to stop capturing the recording immediately after output of the specified portion has ended;
   outputting the video on the second computing device;
   in response to receiving the consent, determining whether the specified portion of the video is being outputted;
   in response to detecting that the output of the specified portion has initiated, capturing the recording throughout the output of the specified portion based on the consent; and
   transmitting the recording to the first computing device.

2. The method of claim 1, wherein the video is transmitted over a communication platform.

3. The method of claim 1, wherein the first computing device is of a first user and wherein the user of the second computing device is a second user.

4. The method of claim 3, wherein the specified portion is selected by the first user.

5. The method of claim 1, wherein capturing the recording comprises:
   activating the camera on board the second computing device, wherein the camera faces the user.

6. The method of claim 1, further comprising:
   requesting consent from the user to send the recording to the first computing device; and
   in response to receiving the consent from the user, transmitting the recording to the first computing device.

7. The method of claim 1, wherein the specified portion of the video is identified by a time elapsed in the video and a time remaining in the video.

8. The method of claim 1, wherein receiving the video further comprises:
   receiving, from the user, a selection of one or more moods from a predetermined list of moods;
   identifying, from a plurality of videos, the video in response to determining that the video corresponds to the one or more moods; and
   retrieving the video from the first computing device.

9. The method of claim 8, wherein the predetermined list of moods comprises one or more of: happy, sad, motivated, surprised, studious.

10. The method of claim 1, further comprising:
    requesting, on the second computing device, at least one selection from a plurality of indicators of a type of emotion the video generated, wherein the plurality of indicators includes a "like" indicator that is indicative of a positive emotion and a "dislike" indicator that is indicative of a negative emotion.

11. The method of claim 10, further comprising:
    receiving a selection, by the user, of the "dislike" indicator that is indicative of the negative emotion.

12. The method of claim 10, wherein the video is transmitted over a communication platform, wherein the first computing device is of a first user and wherein the user of the second computing device is a second user, further comprising:
    generating a prompt at the second computing device that provides an option for the second user to report the first user to the communication platform.

13. The method of claim 12, wherein the communication platform is configured to determine whether the first user is violating a social contract of the communication platform based on metric associated with the first user, wherein the metric includes one or more of a first number of "dislikes" received for the first user from a specified user, a second of number of "dislikes" received for the first user from multiple users, a third number of reports received against the first user, a frequency at which the dislikes are received, or a frequency at which the reports are received.

14. The method of claim 13, wherein the communication platform is further configured to determine if a combination of the metrics exceeds a specified threshold, and respond to a determination that the combination of the metrics exceeds the specified threshold by suspending recording privileges of the first user that disables the first user from sending videos to any of multiple users of the communication platform.

15. The method of claim 12, further comprising:
    determining that the second user has reported the first user for sending the video, wherein the communication platform is configured to block communication between the first user and the second user.

16. The method of claim 15, wherein the communication platform is configured to open the communication between the first user and the second user in response to determining that the second user has removed the report against the first user.

17. The method of claim 1, wherein receiving the video further comprises:
    determining if the video is sent anonymously; and
    in response to a determination that the video is sent anonymously, removing user identifiable information associated with a user of the first computing device from the video prior to outputting the video.

18. The method of claim 17, further comprising:
    in response to determining that the user of the second computing device reported the user of the first computing device to a communication platform, revealing the user identifiable information associated with the user of the first computing device to the user of the second computing device.

19. The method of claim 1, further comprising:
    generating multiple categories of contacts, each category being representative of a relationship type of the user with contacts in that category, wherein the relationship type is determined based on a degree of interaction between the user and the contacts in a communication platform.

20. The method of claim 19, further comprising:
    receiving multiple videos generated by the user, wherein each video comprises information regarding the user that is customized for a specified relationship type; and
    assigning a specified video that is generated for a specified relationship type to a corresponding specified category, wherein contacts in the specified category are restricted from viewing videos other than the one assigned to the specified category.

21. The method of claim 19, wherein generating the multiple categories includes:
    generating a first category of the multiple categories, which includes all contacts from an address book stored in the computing device,
    generating a second category of the multiple categories, which includes those contacts from the address book to whom the user has sent one or more videos; and
    generating a third category of the multiple categories, which includes those contacts from the address book with whom the user has exchanged one or more videos.

22. The method of claim 21, further comprising:
    assigning a first video to the first category, a second video to the second category, and a third video to the third category, wherein each of the three videos has a recording of the user with content relevant to a corresponding category, wherein contacts in a category of multiple categories are restricted from viewing videos other than the one assigned to the corresponding category.

23. The method of claim 19, further comprising:
    determining if a specified contact in any of the multiple categories of contacts of the user has an associated video; and
    displaying, at the second computing device, a video indicator in association with the specified contact, the video indicator indicating that the specified contact has the associated video.

24. The method of claim 23, further comprising:
    receiving a request from the user to view the associated video;
    determining a specified category to which the user is classified into for the specified contact; and
    retrieving the associated video corresponding to the specified category.

25. The method of claim 1, further comprising:
    generating an inbox folder on the second computing device, wherein the inbox folder provides access to a first set of videos received from one or more users of a communication platform, wherein at least some videos from the first set of videos includes video recordings of corresponding users while viewing portions of the at least some videos.

26. The method of claim 25, further comprising:
generating an outbox folder on the second computing device, wherein the outbox folder provides access to a second set of videos sent by the user to one or more users of the communication platform, wherein at least some videos from the second set of videos includes video recordings of the user while viewing portions of the at least some videos.

27. A system for reaction recording generation and transmission, comprising:
 a memory; and
 a processor communicatively coupled with the memory and configured to:
  receive, from a first computing device, both a video and a request for a recording during output of a specified portion from the video on a second computing device;
  request, on the second computing device, consent from a user of the second computing device to capture the recording during the output of the specified portion, wherein the consent grants permission for a camera on board the second computing device to capture the recording when the specified portion is output on the second computing device and to stop capturing the recording immediately after output of the specified portion has ended;
  output the video on the second computing device;
  in response to receiving the consent, determine whether the specified portion of the video is being outputted;
  in response to detecting that the output of the specified portion has initiated, capture the recording throughout the output of the specified portion based on the consent; and
  transmit the recording to the first computing device.

* * * * *